US011935497B2

(12) United States Patent
Ishihara et al.

(10) Patent No.: US 11,935,497 B2
(45) Date of Patent: Mar. 19, 2024

(54) DISPLAY DEVICE

(71) Applicant: Japan Display Inc., Tokyo (JP)

(72) Inventors: Tomoyuki Ishihara, Tokyo (JP);
Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 8 days.

(21) Appl. No.: 17/959,696

(22) Filed: Oct. 4, 2022

(65) Prior Publication Data

US 2023/0116488 A1 Apr. 13, 2023

(30) Foreign Application Priority Data

Oct. 8, 2021 (JP) .................................. 2021-166388

(51) Int. Cl.
*G09G 3/36* (2006.01)
*G06F 3/01* (2006.01)
*G09G 3/34* (2006.01)

(52) U.S. Cl.
CPC ............... *G09G 3/36* (2013.01); *G06F 3/013* (2013.01); *G09G 3/3406* (2013.01); *G09G 2300/023* (2013.01); *G09G 2320/0276* (2013.01); *G09G 2320/066* (2013.01); *G09G 2354/00* (2013.01)

(58) Field of Classification Search
CPC ........................................................ G09G 3/36
See application file for complete search history.

(56) References Cited

U.S. PATENT DOCUMENTS

| | | | |
|---|---|---|---|
| 2017/0032744 A1* | 2/2017 | Yoo | G09G 3/2007 |
| 2019/0279581 A1* | 9/2019 | Furuta | G02F 1/13471 |
| 2021/0142745 A1 | 5/2021 | Kimura et al. | |
| 2022/0392418 A1* | 12/2022 | Tomizawa | G09G 3/3426 |
| 2023/0114708 A1* | 4/2023 | Harada | G09G 3/3406 |
| | | | 345/694 |
| 2023/0335070 A1* | 10/2023 | Ishihara | G09G 3/34 |

FOREIGN PATENT DOCUMENTS

WO 2019225137 A1 11/2019

* cited by examiner

*Primary Examiner* — William Boddie
*Assistant Examiner* — Andrew B Schnirel
(74) *Attorney, Agent, or Firm* — K&L Gates LLP

(57) ABSTRACT

According to an aspect, a display device includes: a first panel including pixels; a second panel including light control pixels; and a light source. When any of the pixels is controlled to transmit light in accordance with an input image signal, blurring processing is applied, a blurring area is formed, and light from the light source transmits through the blurring area and the pixel controlled to transmit light and is emitted from the first panel. When a straight line connecting a user viewpoint and the pixel controlled to transmit light has an angle relative to a normal to the first panel, a center of the blurring area is at a position shifted to a side opposite to a reference normal side relative to the normal to the first panel passing through a center of the pixel. The reference normal is a normal to the first panel passing through the viewpoint.

9 Claims, 12 Drawing Sheets

DISPLAY DEVICE

CROSS-REFERENCE TO RELATED APPLICATION

This application claims the benefit of priority from Japanese Patent Application No. 2021-166388 filed on Oct. 8, 2021, the entire contents of which are incorporated herein by reference.

BACKGROUND

1. Technical Field

What is disclosed herein relates to a display device.

2. Description of the Related Art

It is known that there is a configuration in which a light control panel is provided between a liquid crystal display panel and a light source to increase image contrast (for example, International Publication WO 2019/225137).

When the area in which a light control panel transmits light is larger than the area of pixels controlled to transmit light in a liquid crystal display panel, an image can be visually recognized with favorable display quality from wherever a user views the image, for example, from an oblique viewpoint. However, simply expanding the area in which the light control panel transmits light is not enough to fully exert the effect of increasing image contrast, depending on the positional relation between a user viewpoint and the liquid crystal display panel.

For the foregoing reasons, there is a need for a display device that can obtain more favorable display quality corresponding to a user viewpoint position assumed in advance.

SUMMARY

According to an aspect, a display device includes: a first panel including a plurality of pixels; a second panel that includes one surface disposed opposing one surface of the first panel and includes a plurality of light control pixels; and a light source configured to emit light to the other surface of the second panel. When any of the pixels is controlled to transmit light in accordance with an input image signal, blurring processing by which more than one of the light control pixels is controlled to transmit light is applied, a blurring area including the more than one of the light control pixels to which the blurring processing is applied is formed, and light from the light source transmits through the blurring area and the pixel controlled to transmit light and is emitted from the other surface of the first panel. When a straight line connecting a user viewpoint and the pixel controlled to transmit light in the first panel has an angle relative to a normal to the first panel, a center of the blurring area generated in correspondence with the pixel is at a position shifted to a side opposite to a reference normal side where a reference normal is positioned, relative to the normal to the first panel passing through a center of the pixel. The reference normal is a normal to the first panel passing through the viewpoint.

DETAILED DESCRIPTION

Embodiments of this disclosure are described below with reference to the drawings. The disclosure is only an example, and any changes that can be easily conceived by those skilled in the art while maintaining the main purpose of the invention are naturally included in the scope of the disclosure. The drawings may be schematically represented in terms of the width, thickness, shape, etc. of each part compared to those in the actual form for the purpose of clearer explanation, but they are only examples and do not limit the interpretation of this disclosure. In the present specification and the drawings, the same reference sign is applied to the same elements as those already described for the previously mentioned drawings, and detailed explanations may be omitted as appropriate.

In this disclosure, when an element is described as being "on" another element, the element can be directly on the other element, or there can be one or more elements between the element and the other element.

First Embodiment

Figure 1:
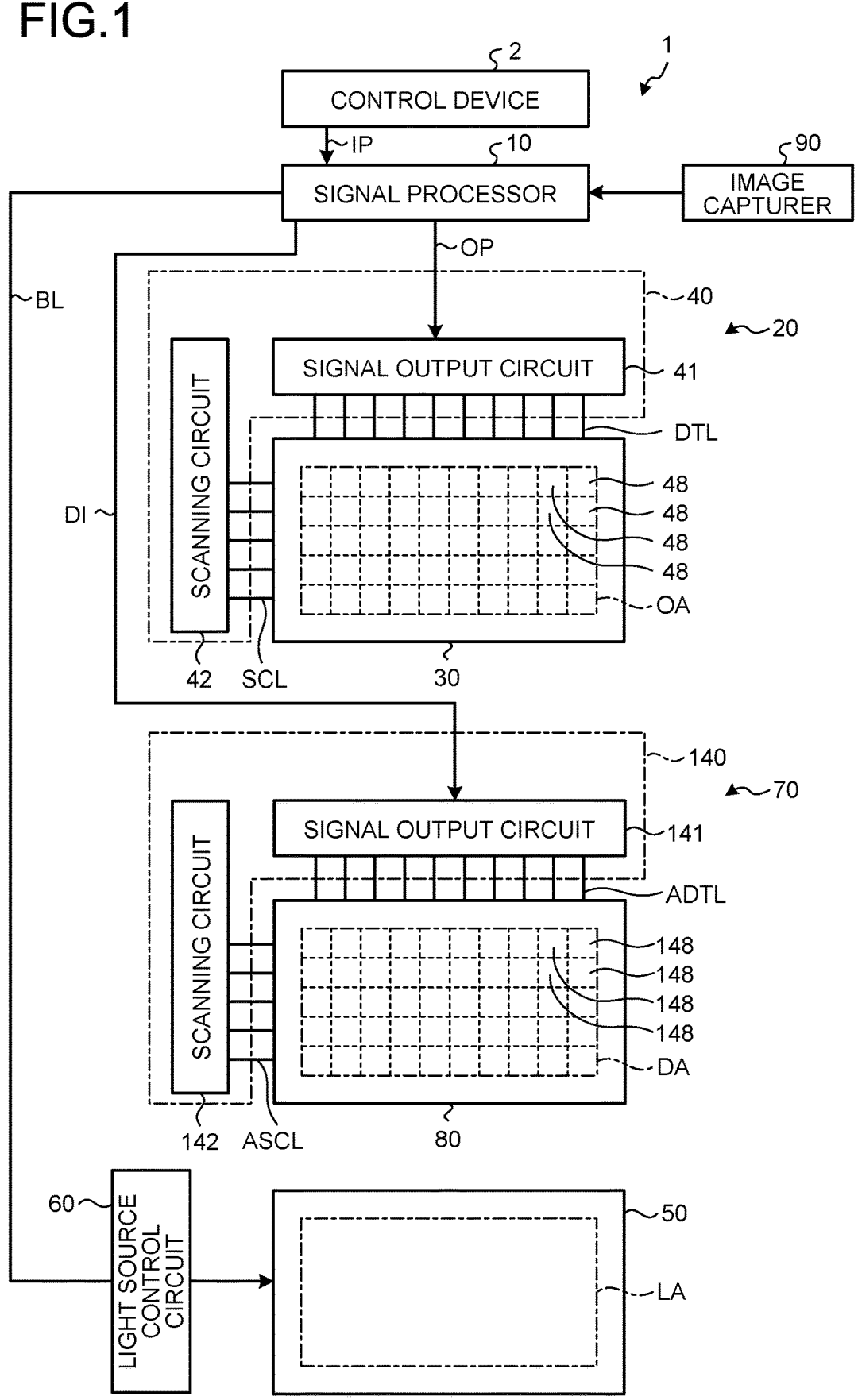
FIG. 1 is a diagram illustrating an exemplary main configuration of a display device of a first embodiment.

FIG. 1 is a diagram illustrating an exemplary main configuration of a display device 1 of a first embodiment. The display device 1 of the first embodiment includes a signal processor (signal processing circuit) 10, a display 20, a light source device 50, a light source control circuit 60, a light controller (light dimmer circuit) 70, and an image capturer (image capturing device) 90. The signal processor 10 performs various kinds of outputting based on an input signal IP that is input from an external control device 2 and controls operation of the display 20, the light source device 50, and the light controller 70. The input signal IP functions as data for causing the display device 1 to perform image display and is, for example, an RGB image signal. The input signal IP corresponds to the resolution of a display panel 30. Specifically, the input signal IP includes pixel signals corresponding to the number of pixels 48 of the display panel 30 to be described later and arrangement of the pixels 48 in an X direction and a Y direction. The signal processor 10 outputs, to the display 20, an output image signal OP generated based on the input signal IP. The signal processor 10 also outputs, to the light controller 70, a light control signal DI generated based on the input signal IP. In addition, upon inputting of the input signal IP, the signal processor 10 outputs, to the light source control circuit 60, a light source drive signal BL for controlling lighting of the light source device 50. The light source control circuit 60 is, for example, a driver circuit of the light source device 50 and operates the light source device 50 in accordance with the light source drive signal BL. The light source device 50 includes a light source configured to emit light from a light emission region LA. In the first embodiment, the light source control circuit 60 operates the light source device 50 so that light is emitted at a constant quantity from the light emission region LA of the light source device 50 in accordance with the display timing of a frame image.

The display 20 includes the display panel 30 and a display panel driver 40. The display panel 30 includes a display region OA provided with the pixels 48. The pixels 48 are disposed, for example, in a matrix of rows and columns. The display panel 30 of the first embodiment is a liquid crystal image display panel. The display panel driver 40 includes a signal output circuit 41 and a scanning circuit 42. The signal output circuit 41 functions as what is called a source driver and drives the pixels 48 in accordance with the output image signal OP. The scanning circuit 42 functions as what is called a gate driver and outputs a drive signal for scanning the pixels 48 disposed in a matrix of rows and columns, in units of a predetermined number of rows (for example, one row). The pixels 48 are driven such that gradation value outputting is performed in accordance with the output image signal OP at the output timing of the drive signal.

The light controller 70 adjusts the quantity of light emitted from the light source device 50 and output through the display region OA. The light controller 70 includes a light control panel 80 and a light control panel driver 140. The light control panel 80 includes a light control region DA that can change light transmittance. The light control region DA is disposed at a position overlapping the display region OA in plan view. The light control region DA overlaps the entire display region OA in plan view. The light emission region LA overlaps the entire display region OA and the entire light control region DA in plan view. Plan view is a front view of the X-Y plane.

Figure 2:
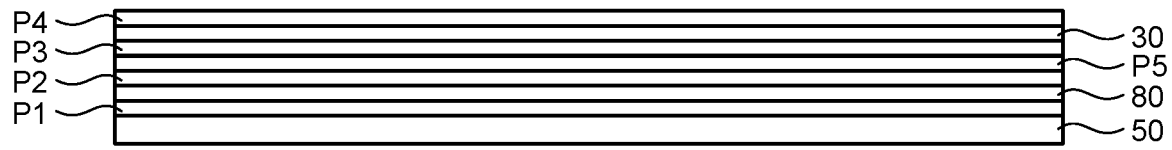
FIG. 2 is a diagram illustrating the positional relation between a display panel, a light control panel, and a light source device.
Figure 2:
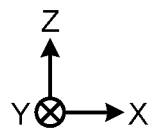

FIG. 2 is a diagram illustrating the positional relation between the display panel 30, the light control panel 80, and the light source device 50. In the first embodiment, as exemplarily illustrated in FIG. 2, the display panel 30, the light control panel 80, and the light source device 50 are stacked. Specifically, the light control panel 80 is stacked on an emission surface side where light is output from the light source device 50. The display panel 30 is stacked on an opposite side of the light control panel 80 to the light source device 50 side of the light control panel 80 such that the light control panel 80 is interposed between the display panel 30 and the light source device 50. Light emitted from the light source device 50 is subjected to light quantity adjustment at the light control region DA of the light control panel 80 to illuminate the display panel 30. The display panel 30 is illuminated from a back surface side where the light source device 50 is disposed, and displays an image on the opposite side (display surface side) to the back surface side. In this manner, the light source device 50 functions as a backlight that illuminates the display region OA of the display panel 30 from the back surface. In the first embodiment, the light control panel 80 is provided between the display panel 30 and the light source device 50. Hereinafter, a Z direction is defined to be a direction in which the display panel 30, the light control panel 80, and the light source device 50 are stacked. The X direction and the Y direction are defined to be two directions orthogonal to the Z direction. The X direction is orthogonal to the Y direction. The pixels 48 are arranged in a matrix of rows and columns in the X and Y directions. Specifically, the number of pixels 48 arranged in the X direction is h, and the number of pixels 48 arranged in the Y direction is v. The numbers h and v are natural numbers equal to or larger than two.

A first polarizer P1 is provided on the back surface side of the light control panel 80. A second polarizer P2 is provided on the display surface side of the light control panel 80. A third polarizer P3 is provided on the back surface side of the display panel 30. A fourth polarizer P4 is provided on the display surface side of the display panel 30. A diffusion layer P5 is provided between the second polarizer P2 and the third polarizer P3. The first polarizer P1, the second polarizer P2, the third polarizer P3, and the fourth polarizer P4 each allow transmission of light polarized in a particular direction and do not allow transmission of light polarized in any other direction. The polarization direction of polarized light allowed to transmit through the first polarizer P1 is orthogonal to the polarization direction of polarized light allowed to transmit through the second polarizer P2. The polarization direction of polarized light allowed to transmit through the second polarizer P2 is the same as the polarization direction of polarized light allowed to transmit through the third polarizer P3. The polarization direction of polarized light allowed to transmit through the third polarizer P3 is orthogonal to the polarization direction of polarized light allowed to transmit through the fourth polarizer P4. The diffusion layer P5 diffuses and emits incident light. Since the polarization directions of the second polarizer P2 and the third polarizer P3 are the same, either one of them may be eliminated. With this configuration, improvement in transmittance is expected. When both of the second polarizer P2 and the third polarizer P3 are provided, contrast is improved as compared to a case in which only one of them is provided. When either one of the second polarizer P2 and the third polarizer P3 is omitted, it is preferable to omit the second polarizer P2, because the contrast can be improved by limiting, by the third polarizer P3, the polarization direction of light diffused by the diffusion layer P5.

Figure 3:
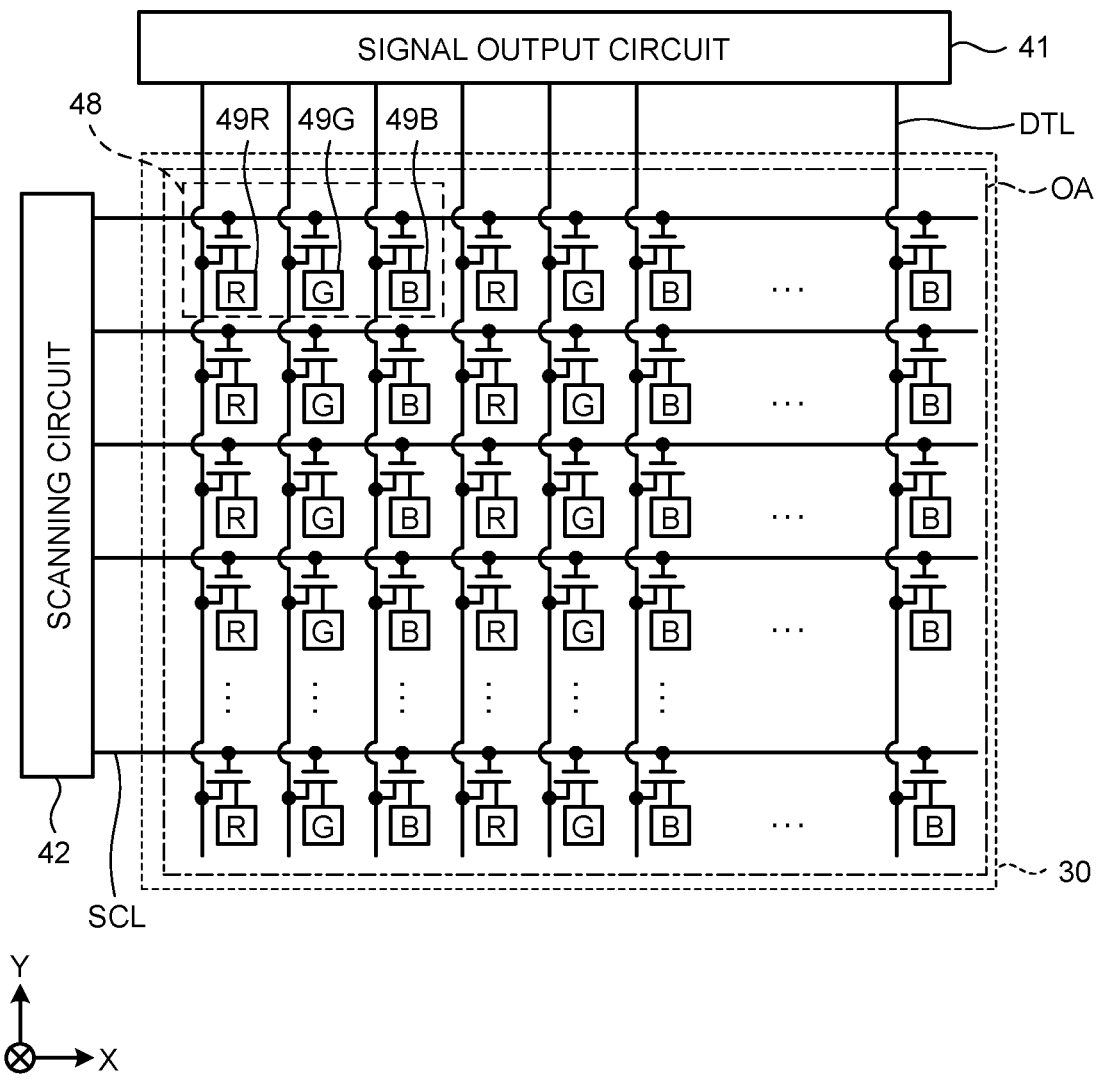
FIG. 3 is a diagram illustrating an exemplary pixel array of a display panel.

FIG. 3 is a diagram illustrating an exemplary pixel array of the display panel 30. As exemplarily illustrated in FIG. 3, each pixel 48 includes, for example, a first sub pixel 49R, a second sub pixel 49G, and a third sub pixel 49B. The first sub pixel 49R displays a first primary color (for example, red). The second sub pixel 49G displays a second primary color (for example, green). The third sub pixel 49B displays a third primary color (for example, blue). In this manner, the pixels 48 arrayed in a matrix of rows and columns in the display panel 30 each include the first sub pixel 49R configured to display a first color, the second sub pixel 49G configured to display a second color, and the third sub pixel 49B configured to display a third color. The first color, the second color, and the third color are not limited to the first primary color, the second primary color, and the third primary color but may be any colors different from one another, such as complementary colors. In the following description, the first sub pixel 49R, the second sub pixel 49G, and the third sub pixel 49B are referred to as sub pixels 49 when they do not need to be distinguished from one another.

Each pixel 48 may include another sub pixel 49 in addition to the first sub pixels 49R, the second sub pixels 49G, and the third sub pixels 49B. For example, each pixel 48 may include a fourth sub pixel that displays a fourth color. The fourth sub pixel displays the fourth color (for example, white). The fourth sub pixel is preferably brighter than the first sub pixel 49R that displays the first color, the second sub pixel 49G that displays the second color, and the third sub pixel 49B that displays the third color, when they are irradiated at the same light source lighting amount.

More specifically, the display device 1 is a transmissive color liquid crystal display device. As exemplarily illustrated in FIG. 3, the display panel 30 is a color liquid crystal display panel and is provided with a first color filter that allows transmission of light in the first primary color and is disposed between the first sub pixel 49R and an image viewer, a second color filter that allows transmission of light in the second primary color and is disposed between the second sub pixel 49G and the image viewer, and a third color filter that allows transmission of light in the third primary color and is disposed between the third sub pixel 49B and the image viewer. The first color filter, the second color filter, and the third color filter are included in a filter film 26 to be described later.

In a case in which the fourth sub pixel is provided, no color filter is disposed between the fourth sub pixel and the image viewer. In this case, a large step occurs at the fourth sub pixel. Thus, the fourth sub pixel may include a transparent resin layer in place of a color filter. With this configuration, the occurrence of a large step at the fourth sub pixel can be prevented.

The signal output circuit 41 is electrically coupled to the display panel 30 through signal lines DTL. The display panel driver 40 selects the sub pixels 49 in the display panel 30 by the scanning circuit 42 and controls on-and-off of switching elements (for example, thin film transistors (TFT)) for controlling operation (light transmittance) of the sub pixels 49. The scanning circuit 42 is electrically coupled to the display panel 30 through scanning lines SCL.

In the first embodiment, the signal lines DTL are arranged in the X direction. The signal lines DTL extend in the Y direction. The scanning lines SCL are arranged in the Y direction. The scanning lines SCL extend in the X direction. Thus, in the first embodiment, the pixels 48 are driven in accordance with a drive signal output from the scanning circuit 42 on a pixel row (line) basis. One pixel row (line) includes a plurality of pixels 48 arranged in the X direction and sharing one scanning line SCL. Hereinafter, a line means a pixel row including a plurality of pixels 48 arranged in the X direction and sharing one scanning line SCL.

The extending direction of the scanning lines SCL is defined to be a horizontal scanning direction. The arrangement direction of the scanning lines SCL is defined to be a vertical scanning direction. In the first embodiment, the X direction corresponds to the horizontal scanning direction, and the Y direction corresponds to the vertical scanning direction.

Figure 4:
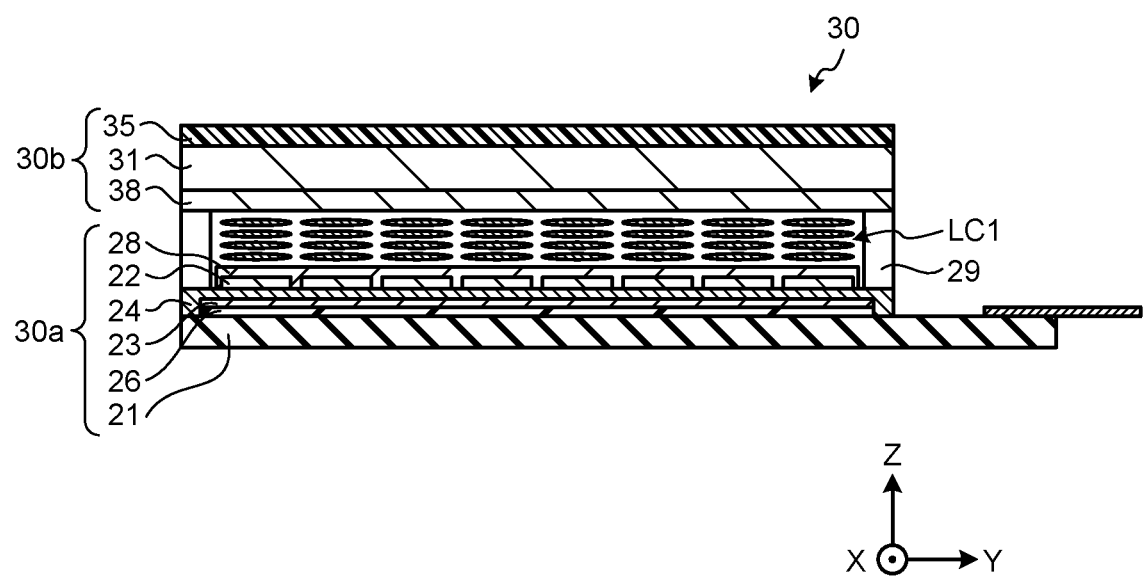
FIG. 4 is a sectional view illustrating an exemplary schematic sectional structure of the display panel.

FIG. 4 is a sectional view illustrating an exemplary schematic sectional structure of the display panel 30. An array substrate 30a includes the filter film 26 provided on the upper side of a pixel substrate 21 such as a glass substrate, a counter electrode 23 provided on the upper side of the filter film 26, an insulating film 24 provided directly on the counter electrode 23, pixel electrodes 22 on the insulating film 24, and a first alignment film 28 provided on an uppermost surface of the array substrate 30a. A counter substrate 30b includes a counter pixel substrate 31 such as a glass substrate, a second alignment film 38 provided on the lower surface of the counter pixel substrate 31, and a polarizer 35 provided on the upper surface of the counter pixel substrate 31. The array substrate 30a and the counter substrate 30b are fixed to each other through a sealing part 29. A liquid crystal layer LC1 is sealed in a space surrounded by the array substrate 30a, the counter substrate 30b, and the sealing part 29. The liquid crystal layer LC1 contains a liquid crystal molecule having an alignment direction that changes in accordance with an applied electric field. The liquid crystal layer LC1 modulates light transmitted therethrough in accordance with the state of the electric field. The alignment direction of the liquid crystal molecule of the liquid crystal layer LC1 changes with an electric field applied between the pixel electrodes 22 and the counter electrode 23, and consequently, the transmission amount of light transmitting through the display panel 30 changes. The sub pixels 49 each include a pixel electrode 22. The switching elements for individually controlling operation (light transmittance) of the sub pixels 49 are electrically coupled to the pixel electrodes 22.

The light controller 70 includes the light control panel 80 and the light control panel driver 140. The light control panel 80 of the first embodiment has the same configuration as the display panel 30 illustrated in FIG. 4 except for omission of the filter film 26. Thus, the light control panel 80 includes a light control pixel 148 provided with no color filter unlike each pixel 48 (refer to FIG. 3) including the first sub pixel 49R, the second sub pixel 49G, and the third sub pixel 49B, which are distinguished based on the colors of their color filters (refer to FIG. 1). In other words, the light control panel 80 is a monochrome liquid crystal panel.

The light control panel driver 140 including a signal output circuit 141 and a scanning circuit 142 has the same configuration as the display panel driver 40 except that the light control panel driver 140 is coupled to the light control panel 80. Signal lines ADTL between the light control panel 80 and the light control panel driver 140 illustrated in FIG. 1 have the same configuration as the signal lines DTL described above with reference to FIG. 3. Scanning lines ASCL between the light control panel 80 and the light control panel driver 140 illustrated in FIG. 1 have the same configuration as the scanning lines SCL described above with reference to FIG. 3. In the light control panel 80 of the present embodiment, two or more of the light control pixels 148 are controlled as one light control unit. The area that is controlled as one light control unit in the light control panel 80 includes a plurality of pixels 48 in plan view. In description of the first embodiment, the width of the area that is controlled as one light control unit in the X direction corresponds to the width of three pixels 48 arranged in the X direction. The width of the area that is controlled as one light control unit in the Y direction corresponds to the width of three pixels 48 arranged in the Y direction. Thus, 3×3=9 pixels 48 are disposed in the area that is controlled as one light control unit. The number of pixels 48 in the area that is controlled as one light control unit exemplarily described above is merely an example and not limited thereto, and may be changed as appropriate. For example, 2×2=4 pixels 48 may be disposed in the area that is controlled as one light control unit.

In the light control panel 80, one pixel electrode 22 or a plurality of pixel electrodes 22 may be provided in the area that is controlled as one light control unit. When a plurality of pixel electrodes 22 are provided in the area that is controlled as one light control unit, these pixel electrodes 22 are controlled to be equipotential. Consequently, these pixel electrodes 22 can behave as one pixel electrode 22 in effect.

In the first embodiment, disposition of the pixels 48 in the display region OA is the same as disposition of the light control pixels 148 in the light control region DA. Thus, in the first embodiment, the number of pixels 48 arranged in the X direction in the display region OA is equal to the number of light control pixels 148 arranged in the X direction in the light control region DA. In the first embodiment, the number of pixels 48 arranged in the Y direction in the display region OA is equal to the number of light control pixels 148 arranged in the Y direction in the light control region DA. In the first embodiment, the display region OA and the light control region DA overlap each other in X-Y plan view. The Z direction corresponds to an optical axis LL of light emitted from the light emission region LA of the light source device 50. Thus, an optical axis (optical axis LL) of light passing through one of the pixels 48 coincides with an optical axis of light passing through one light control pixel 148 located at a position overlapping with the one pixel 48 in X-Y plan view. However, light emitted from the light emission region LA is incoherent light that radially diffuses. Thus, a light beam in a direction not aligned with the optical axis LL enters the light control pixel 148 and the pixel 48 in some cases.

Light emitted from the light source device 50 enters the light control panel 80 through the first polarizer P1. Light having transmitted through the light control pixel 148 of the light control panel 80 enters the display panel 30 through the second polarizer P2, the diffusion layer P5, and the third polarizer P3. Light having transmitted through the pixels 48 of the display panel 30 is output through the fourth polarizer P4. An image output from the display device 1 is visually recognized by a user of the display device 1 based on the light output in this manner. The user is a person who visually recognizes an image output from the display device 1, and is, for example, a user H illustrated in FIG. 10 and other figures.

Assuming that an image is viewed by a user from the front side of a plate surface (X-Y plane) of the display device 1. In this case, it is considered that the user of the display device 1 can view the image output from the display device 1 with no problem when a light control pixel 148 capable of transmitting light having an optical axis that coincides with the optical axis LL passing through a pixel 48 controlled to transmit light in the display panel 30, is controlled to transmit light. In this case, a light control pixel 148 corresponding to a pixel 48 controlled not to transmit light in the display panel 30 (i.e., the light control pixel 148 an optical axis of which coincides with an optical axis of the pixel 48 controlled not to transmit light) is controlled not to transmit light. However, the user of the display device 1 does not always view an image from the front side of the plate surface (X-Y plane) of the display device 1. When the pixels 48 and the light control pixels 148 are controlled in the same manner as in the above-described case in which an image is viewed from the front side of the plate surface (X-Y plane) of the display device 1, a user who views the fourth polarizer P4 side of the display device 1 in a direction having an angle (perspective angle) intersecting the plate surface and the Z direction, visually recognizes a double image and/or a partially missing image in some cases.

Figure 5:
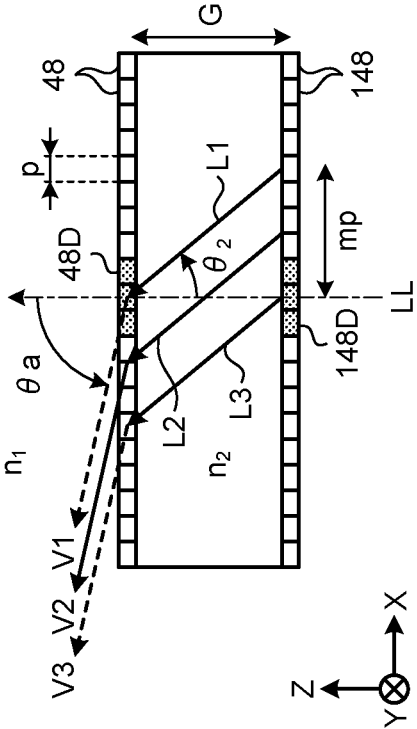
FIG. 5 is a diagram illustrating the generation principles and examples of a double image and a partially missing image.

FIG. 5 is a diagram illustrating the generation principles and examples of the double image and the partially missing image. In FIG. 5, schematic sectional views of the display device 1 are illustrated in the column of "PANEL SCHEMATIC DIAGRAM". In the schematic sectional views, pixels 48 and light control pixels 148 at which the liquid crystal orientation is controlled to transmit light are illustrated with white rectangles. In the schematic sectional views, a set of a plurality of pixels 48 at which the liquid crystal orientation is controlled not to transmit light, is illustrated as a light-blocking part 48D with dotted rectangles. In the schematic sectional views, a set of a plurality of light control pixels 148 at which the liquid crystal orientation is controlled not to transmit light, is illustrated as a light-blocking part 148D with dotted rectangles.

Light is transmitted through a light control pixel 148, through a multilayered structure (the second polarizer P2, the diffusion layer P5, and the third polarizer P3) between the light control pixel 148 and a pixel 48, and then through the pixel 48, and finally emitted from the emission surface side of the display panel 30 through the fourth polarizer P4 (refer to FIG. 2). When the light is emitted from the emission surface side of the display panel 30, refraction occurs due to the refractive index difference between the multilayered structure and the air on the emission surface side. In FIG. 5, the refraction is indicated as the difference between the traveling angle θb of light in the display device 1 and the emission angle θa of light outside the emission surface of the display device 1. The traveling angle θb is an angle due to the difference between the refractive index $n_2$ of the multilayered structure and the refractive index $n_1$ of the air.

More specifically, Expression (1) below is satisfied. In addition, Expression (2) below is satisfied when G represents the interval between a pixel 48 and a light control pixel 148 in the Z direction. In Expression (2), p represents the width of the pixel 48 in the X direction. In Expression (2), m represents a numerical value that indicates the amount of a positional shift in the X direction between a light emission point on the light control pixel 148 side and a light incident point on the pixel 48 side and is expressed in terms of the number of pixels 48, the positional shift occurring due to the traveling angle θb of light in the display device 1. The air refractive index ($n_1$) is 1.0, and the refractive index ($n_2$) of the multilayered structure (the second polarizer P2, the diffusion layer P5, and the third polarizer P3) is different from 1.0. Expression (3) is satisfied based on Expressions (1) and (2). Thus, a blurring area mp having a center at the optical axis LL and corresponding to θa can be calculated from $n_1$, $n_2$, and θa based on Expression (3). Any light control pixel 148 included in the blurring area mp is controlled to transmit light. G is, for example, the interval between the middle position of each pixel 48 in the Z direction and the middle position of each light control pixel 148 in the Z direction. The middle position of each pixel 48 in the Z direction is the middle position of the display panel 30 in the Z direction. The middle position of each light control pixel 148 in the Z direction is the middle position of the light control panel 80 in the Z direction. G may be regarded as the distance of the liquid crystal layer LC1 between the display panel 30 and the light control panel 80. Hereinafter, a gap G denotes G described in this paragraph.

$$n_1 \sin \theta a = n_2 \sin \theta b \quad (1)$$

$$G \tan \theta b = mp \quad (2)$$

$$mp = G \tan\{[\sin^{-1}](n_1 \sin \theta a/n_2)\} \quad (3)$$

As illustrated in the column of "PANEL SCHEMATIC DIAGRAM" and the row of "DOUBLE IMAGE", due to the above-described refraction, light L1 having transmitted through a light control pixel 148 is emitted as light V1 when it is assumed that the light is not blocked by the light-blocking part 48D. In reality, the light V1 is not emitted because the light is blocked by the light-blocking part 48D. Light L2 having transmitted through a light control pixel 148 is output as light V2. Light transmitted on a light traveling axis L3 is emitted as light V3 illustrated with a dashed line when it is assumed that light is not blocked by the light-blocking part 148D.

In a front view of the emission surface of the display device 1 in the state illustrated in the column of "PANEL SCHEMATIC DIAGRAM" and the row of "DOUBLE IMAGE", both sides of the light-blocking part 48D in the X direction are lighted. In other words, one non-light emission (black) region is observed in front view. However, when the emission surface of the display device 1 is visually recognized at a perspective angle corresponding to an emission angle $\theta_1$ relative to the X-Y plane and the X direction, the optical axes of the light L1 and the light L3, which do not exist in reality, exist with the light V2 interposed therebetween. In other words, two non-light emission (black) regions are arranged in the X direction with the light V2 interposed therebetween. In this manner, an image to be formed as one non-light emission (black) region when viewed in front view may be visually recognized as a double image formed of two non-light emission (black) regions when viewed at a perspective angle. In FIG. 5, a generation example of such a double image is exemplarily illustrated in the column of "EXAMPLE OF VISUALLY RECOGNIZED IMAGE TAKEN FROM OBLIQUE VIEWPOINT" and the row of "DOUBLE IMAGE".

As illustrated in the column of "PANEL SCHEMATIC DIAGRAM" and the row of "DEFECT IN IMAGE", light L4 is emitted as light V4 when it is assumed that the light is not blocked by the light-blocking part 148D. In reality, the light V4 is not emitted because the light is blocked by the light-blocking part 148D. Light L5 is emitted as light V5 when it is assumed that the light is not blocked by the light-blocking part 148D. In reality, the light V5 is not emitted because the light is blocked by the light-blocking part 148D. Even when the light is not blocked by the light-blocking part 148D, the light V5 is not emitted because the light is blocked by the light-blocking part 48D. When it is assumed that the light is not blocked by the light-blocking part 48D, light L6 having transmitted through the light control pixel 148 is emitted as light V6. In reality, the light V6 is not emitted because the light is blocked by the light-blocking part 48D.

In the state illustrated in the column of "PANEL SCHEMATIC DIAGRAM" and the row of "DEFECT IN IMAGE", a pixel 48 that can transmit light is sandwiched between light-blocking parts 48D in the X direction, and thus, one light emission region sandwiched between non-light emission (black) regions is visually recognized in front view. However, no light emission region is visually recognized when the emission surface of the display device 1 is visually recognized at a perspective angle corresponding to the emission angle $\theta_1$ relative to the X-Y plane and the X direction. This is because the light V4, the light V5, and the light V6 are not emitted as described above. In this manner, an image formed in one light emission region in front view is not visually recognized at a perspective angle in some cases. When the display device 1 is visually recognized at a perspective angle, a partially missing image is generated through such a mechanism. In FIG. 5, a generation example of such a partially missing image is exemplarily illustrated in the column of "EXAMPLE OF VISUALLY RECOGNIZED IMAGE TAKEN FROM OBLIQUE VIEWPOINT" and the row of "DEFECT IN IMAGE". In FIG. 5, each light control unit is illustrated as one light control pixel 148; however in reality, each light control unit includes more than one light control pixel 148. Each light control pixel 148 schematically illustrated in FIG. 5 has the same width in the X direction as that of each pixel 48 to facilitate understanding of positional correspondence with the pixels 48; however in reality, more than one pixel 48 is included in the area of one light control unit as described above.

Thus, in the first embodiment, blurring processing is applied in control of an area in the light control panel 80 that transmits light. The blurring processing is processing that controls the light control pixels 148 so that the light control panel 80 transmits light in an area wider than a light transmission area obtained when light is transmitted faithfully to the input signal IP. Thus, an area in which light can transmit in the light control panel 80 to which the blurring processing is applied is larger than an area in which light can transmit in the display panel 30. The blurring processing will be described below with reference to FIG. 6.

Figure 6:
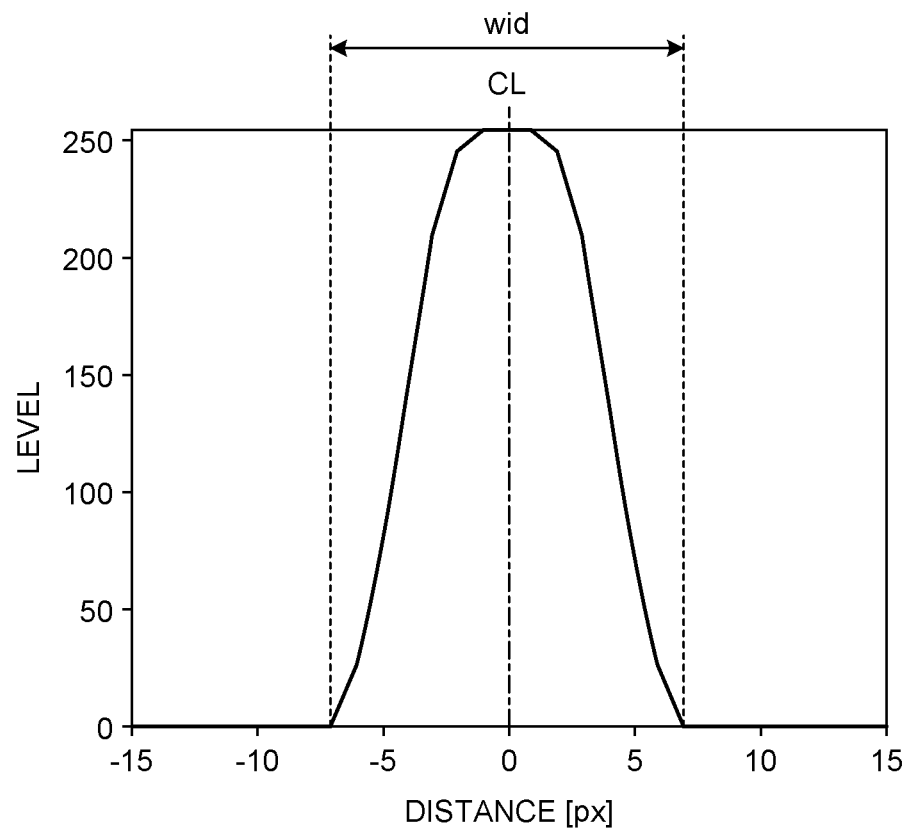
FIG. 6 is a graph illustrating an exemplary relation between the degree (level) of light transmission control by blurring processing and the distance from a light control pixel handled as the coordinates of a center position determined based on the coordinates of a pixel controlled to transmit light at the highest gradation.

FIG. 6 is a graph illustrating an exemplary relation between the degree (level) of light transmission control by the blurring processing and the distance from a light control pixel 148 handled as a center CL determined based on the coordinates of a pixel 48 controlled to transmit light at the highest gradation. In the graph in FIG. 6, the horizontal axis represents the distance, and the vertical axis represents the degree of light transmission. The distance is measured with respect to a "0" distance position where a light control pixel 148 is positioned at the center CL determined by a coordinate determiner 13 to be described later based on the coordinates of a pixel 48 controlled to transmit light at the highest gradation. A light control pixel 148 adjacent to the light control pixel 148 at "0" distance is positioned at "1" distance relative to the light control pixel 148 at "0" distance. Other light control pixels 148 are each arranged in the X direction or the Y direction at the distance of the number of intervening light control pixels 148 plus one with reference to the light control pixel 148 at "0" distance. Although FIG. 6 illustrates the example in which the degree of light transmission is expressed with a gradation of eight bits (256 gradations), this is merely an example and the present invention is not limited thereto. The number of gradation levels may be changed as appropriate.

As exemplarily illustrated in FIG. 6, in the first embodiment, not only the light control pixel 148 at "0" distance but also the light control pixels 148 at the distance of "1" to "6" are controlled to transmit light by the blurring processing. The light control pixel 148 at "1" distance is controlled to transmit light at the same degree as the light control pixel 148 at "0" distance. The light control pixel 148 at the distance of "2" or larger is controlled so that the degree of light transmission decreases as the distance increases. In this manner, the blurring processing is applied to a plurality of light control pixels 148 included in a blurring area wid centered at the light control pixel 148 at "0" distance.

A specific range of the distance from the light control pixel 148 at "0" distance, which defines the blurring area wid to be controlled to transmit light by the blurring processing, is appropriately set. More specifically, a range of the distance from the light control pixel 148 at "0" distance to which the blurring processing is applied, is set based on data such as an allowable range of an angle (θa) at which an oblique viewpoint relative to the display device 1 is established, the size of the gap G, and the like. Similarly, a blurring processing target area is set which is centered at a certain pixel 48 in processing performed based on the gradation values of the pixels 48 by a blurring processing calculator 14 to be described later.

Figure 7:
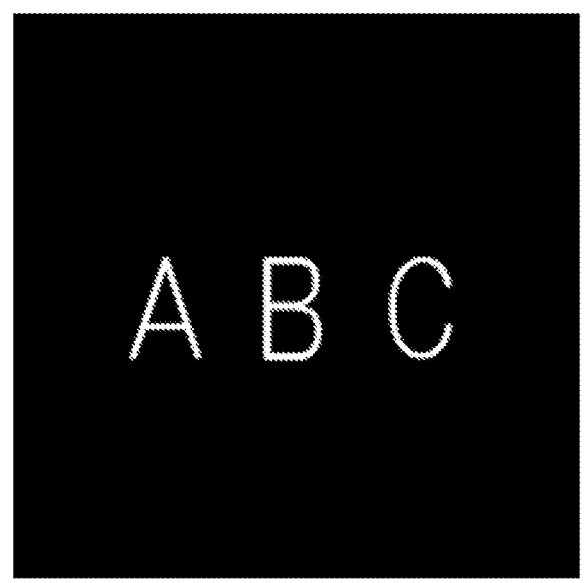
FIG. 7 is a diagram illustrating an exemplary display output image based on an input signal to the display device.
Figure 8:
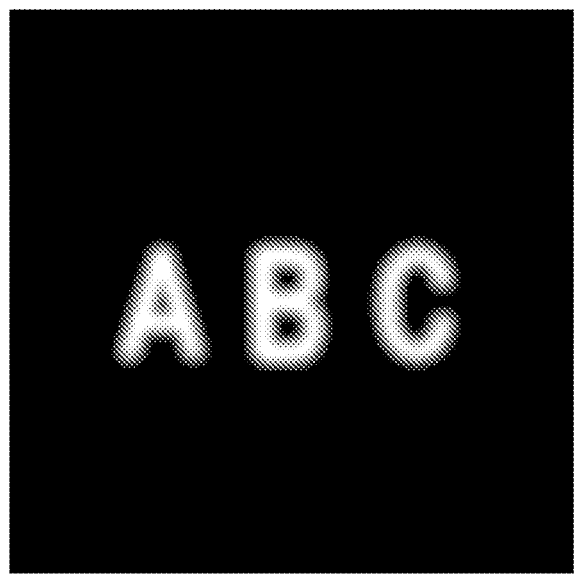
FIG. 8 is a diagram illustrating the area of light transmission of the light control panel to which blurring processing is applied based on the display output image illustrated in FIG. 7.

FIG. 7 is a diagram illustrating an exemplary display output image based on the input signal IP to the display device 1. FIG. 8 is a diagram illustrating the area of light transmission of the light control panel 80 to which the blurring processing is applied based on the display output image illustrated in FIG. 7. In FIGS. 7 and 8, an area controlled to transmit light is illustrated in white, and an area controlled not to transmit light is illustrated in black. As indicated by comparison between FIGS. 7 and 8, in the light control panel 80 to which the blurring processing is applied, the light control pixels 148 are controlled to transmit light in a wider area than the display output image. Specifically, the degree of light transmission by the light control pixels 148 is controlled by thickening the edge line of the area of light transmission in the display output image illustrated in FIG. 7 to increase the area of light transmission outward.

Figure 9:
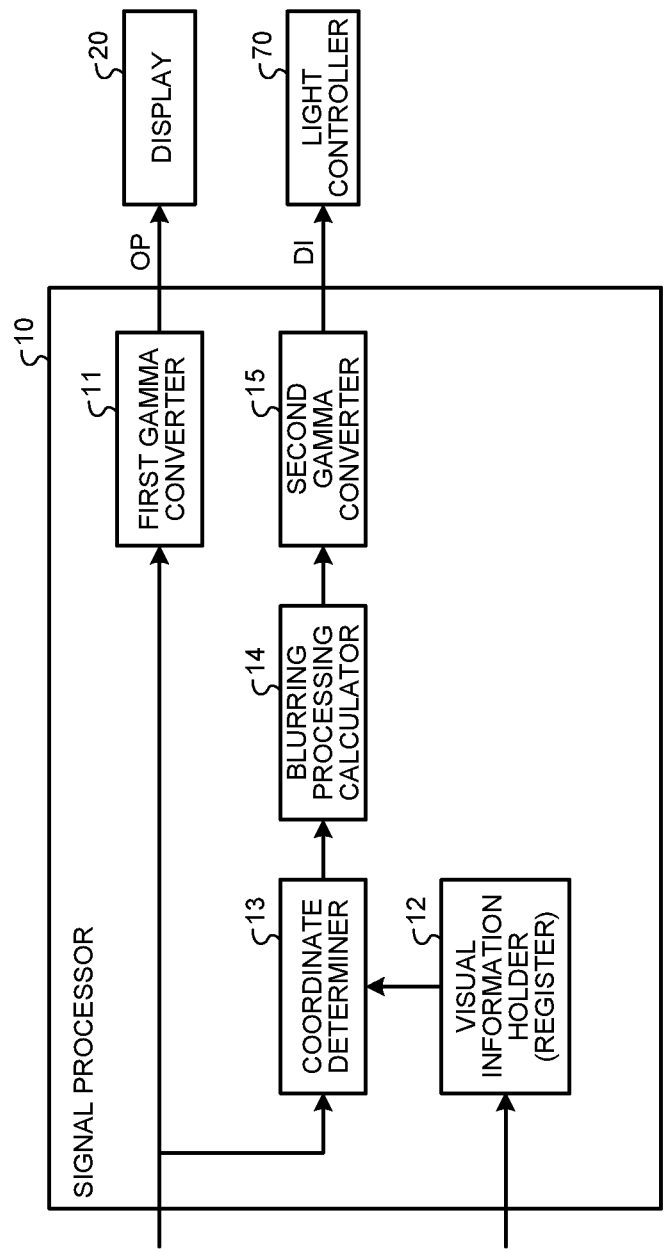
FIG. 9 is a block diagram illustrating an exemplary functional configuration of a signal processor.

FIG. 9 is a block diagram illustrating an exemplary functional configuration of the signal processor 10. The signal processor (signal processing circuit) 10 includes a first gamma converter (first gamma conversion circuit) 11, a visual information holder (visual information holding circuit) 12, the coordinate determiner (coordinate determination circuit) 13, a blurring processing calculator (blurring processing circuit) 14, and a second gamma converter (second gamma conversion circuit) 15.

The first gamma converter 11 performs gamma correction processing when gamma correction between an input value and an output value is necessary. The input value is the RGB gradation value of each pixel included in a frame image indicated by the input signal IP. The output value indicates brightness of each pixel 48 included in the display panel 30 perceived by a user visually recognizing the display region OA when the pixel 48 is controlled at a voltage in accordance with the input value. In the first embodiment, an appropriate output value is obtained by controlling each pixel 48 in accordance with the input value based on a one-to-one relation between the RGB gradation value and the pixel 48, and thus no correction is performed. However, the gamma correction processing is performed by the first gamma converter 11, depending on the gamma characteristic of the display panel 30.

In the first embodiment, as in the above description of the first gamma converter 11, an RGB gradation value (input value) indicated by pixel data provided to a pixel 48 at a certain position by the input signal IP corresponding to one frame image is the same as an RGB gradation value (output value) indicated by pixel data provided to the pixel 48 by the output image signal OP based on the input signal IP. Thus, Ic=g0(Ic) is satisfied when Ic represents the input value and g0(Ic) represents the output value. The output value g0(Ic) can be expressed in the format of the RGB gradation value, namely, (R, G, B)=(α, β, γ). The values α, β, and γ are each a numerical value corresponding to the number of bits of information indicating a gradation value. For example, in a case of eight bits, α, β, and γ each has a value within a range of 0 to 255.

The visual information holder 12 stores various parameters that are referred in center coordinate control of the blurring area to be described later. Specifically, the visual information holder 12 is provided as, for example, a register circuit in which numerical values usable as the parameters are rewritable. The visual information holder 12 may be another storage circuit or storage medium such as a flash memory. Writing to the visual information holder 12 may be performed by a dedicated writing device at any given time such as before and after shipment of the display device 1.

The coordinate determiner 13 determines the center coordinates of the blurring area to be described later. Specifically, when any pixel 48 is controlled to transmit light by the operation of the display panel 30 in accordance with the input signal IP, the coordinate determiner 13 determines, in correspondence with the coordinates of the pixel 48, the coordinates of a light control pixel 148 corresponding to the center CL (refer to FIG. 6) of the blurring area allowing light transmitting through the pixel 48 to transmit therethrough. The blurring processing calculator 14 generates, on the light control panel 80, the blurring area centered at the center CL determined by the coordinate determiner 13.

The blurring processing calculator 14 performs the above-described blurring processing. In addition, the blurring processing calculator 14 derives the blurring area. The blurring area includes any light control pixel 148 to which the blurring processing is applied.

In the first embodiment, the blurring processing calculator 14 derives the blurring area so that the blurring area corresponds to the eye position of a user relative to the display panel 30 when the blurring area centered at the blurring area center coordinates determined by the coordinate determiner 13 is applied to the light control pixels 148 of the light control panel 80. In the first embodiment, the blurring area derived by the blurring processing calculator 14 is the blurring area wid centered at the center CL, which is described above with reference to, for example, FIG. 6.

The second gamma converter 15 performs gamma correction processing when gamma correction is necessary for a light control gradation value. In the first embodiment, the second gamma converter 15 performs the gamma correction processing so that a gamma curve between the lowest gradation (0) and the highest gradation (255 when it is expressed with 8 bits) for each of the light control panel 80 and the display panel becomes a desired gamma curve (for example, gamma curve corresponding to gamma value=2.2). When g1 represents a coefficient used in the gamma correction processing, the light control gradation value after the gamma correction processing by the second gamma converter 15 can be expressed as $g1(Ic_{max}+A)$.

The first gamma converter 11 outputs the output image signal OP to the display panel 30. The output image signal OP is a set of the above-described values g0(Ic) for the respective pixels 48. Each pixel 48 is driven in accordance with g0(Ic) by the operation of the display panel driver 40. The second gamma converter 15 outputs the light control signal DI to the light control panel 80. The light control signal DI is a set of the above-described values $g1(Ic_{max}+A)$ for the respective light control pixels 148. Each light control pixel 148 is driven in accordance with $g1(Ic_{max}+A)$ by the operation of the light control panel driver 140. Specifically, the light control panel 80 operates so that the degree of light transmission of each light control pixel 148 corresponds to the light control gradation value thereof. In the first embodiment, a plurality of sub pixels 49 included in one light control pixel 148 are all driven to achieve the degree of light transmission corresponding to the light control gradation value of the one light control pixel 148.

Unlike a second embodiment to be described later, the first embodiment will be described below for a case in which the relative positional relation with the user H is managed for each pixel 48. In the first embodiment, the blurring area for each of the pixels 48 included in the display device 1 is determined in consideration of the relative positional relation between the pixel 48 and the user H.

Figure 10:
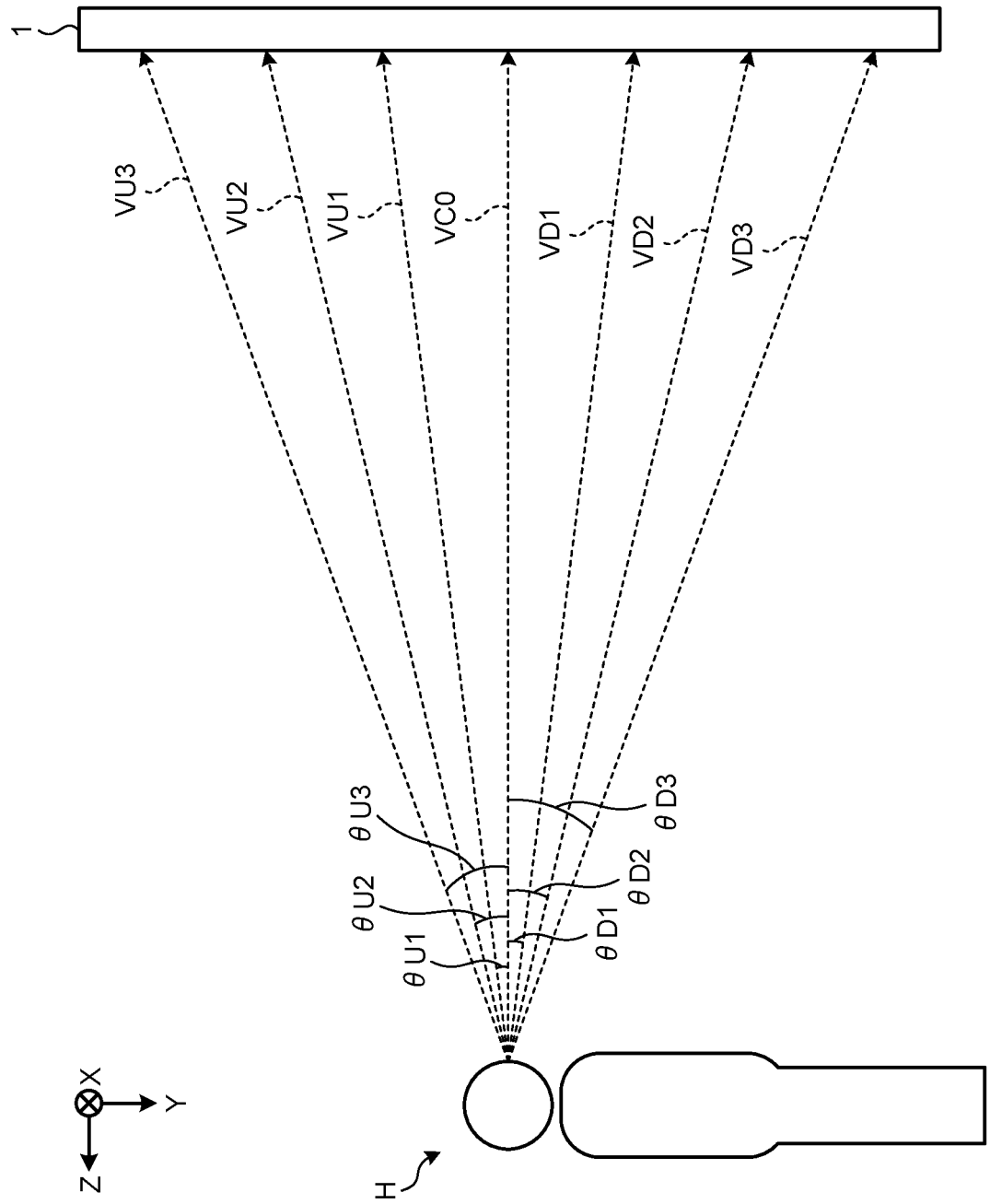
FIG. 10 is a schematic diagram illustrating the relation between the display device and a user and lines of sight (visual lines) from the user to the display device.

FIG. 10 is a schematic diagram illustrating the relation between the display device 1 and the user H and lines of sight from the user H to the display device 1. Hereinafter, the line of sight is referred to as a visual line. FIG. 10 exemplarily illustrates the positional relation between the display device 1 and the user H in which a visual line VC0 from the user H to an image display surface of the display device 1 arrives at the center of the display device 1 in the Y direction. The visual line VC0 is a visual line along the Z direction and along which the user H views the image display surface of the display device 1 provided along the X-Y plane, from the front of the image display surface. In FIG. 10, the visual line VC0 arrives at the center of the display device 1 in the Y direction, but the arrival position of the visual line VC0 is not limited to the center of the display device 1. The visual line VC0 may be a visual line along the direction normal to the display panel 30, and the arrival position of the visual line VC0 passing through a viewpoint E may be inside or outside the display region OA of the display panel 30.

More specifically, FIG. 10 schematically illustrates a case in which the display device 1 is employed as an image display device including an image display surface that is significantly large for the user H, like an image display device employed for, for example, public viewing.

In the display device 1 including an image display surface that is significantly large for the user H in this manner, a visual line from the user H to each position other than the center in the Y direction on the image display surface of the display device 1 is significantly different from the above-described visual line VC0. Specifically, the visual line from the user H may be any of visual lines VU1, VU2, VU3, VD1, VD2, and VD3 illustrated in FIG. 10 having mutually different angles θU1, θU2, θU3, θD1, θD2, and θD3 relative to the visual line VC0 and the Z direction.

The visual line VU1 has the angle θU1 relative to the visual line VC0 in the Y direction. The visual line VD1 has the angle θD1 relative to the visual line VC0 in the Y direction. The angles θU1 and θD1 are symmetric in the Y direction with respect to the visual line VC0.

The visual line VU2 has the angle θU2 relative to the visual line VC0 in the Y direction. The visual line VD2 has the angle θD2 relative to the visual line VC0 in the Y direction. The angle θU2 and the angle θD2 are symmetric in the Y direction with respect to the visual line VC0. The angle θU2 is larger than the angle θU1. The angle θD2 is larger than the angle θD1.

The visual line VU3 has the angle θU3 relative to the visual line VC0 in the Y direction. The visual line VD3 has the angle θD3 relative to the visual line VC0 in the Y direction. The angle θU3 and the angle θD3 are symmetric in the Y direction with respect to the visual line VC0. The angle θU3 is larger than the angle θU2. The angle θD3 is larger than the angle θD2.

Figure 11:
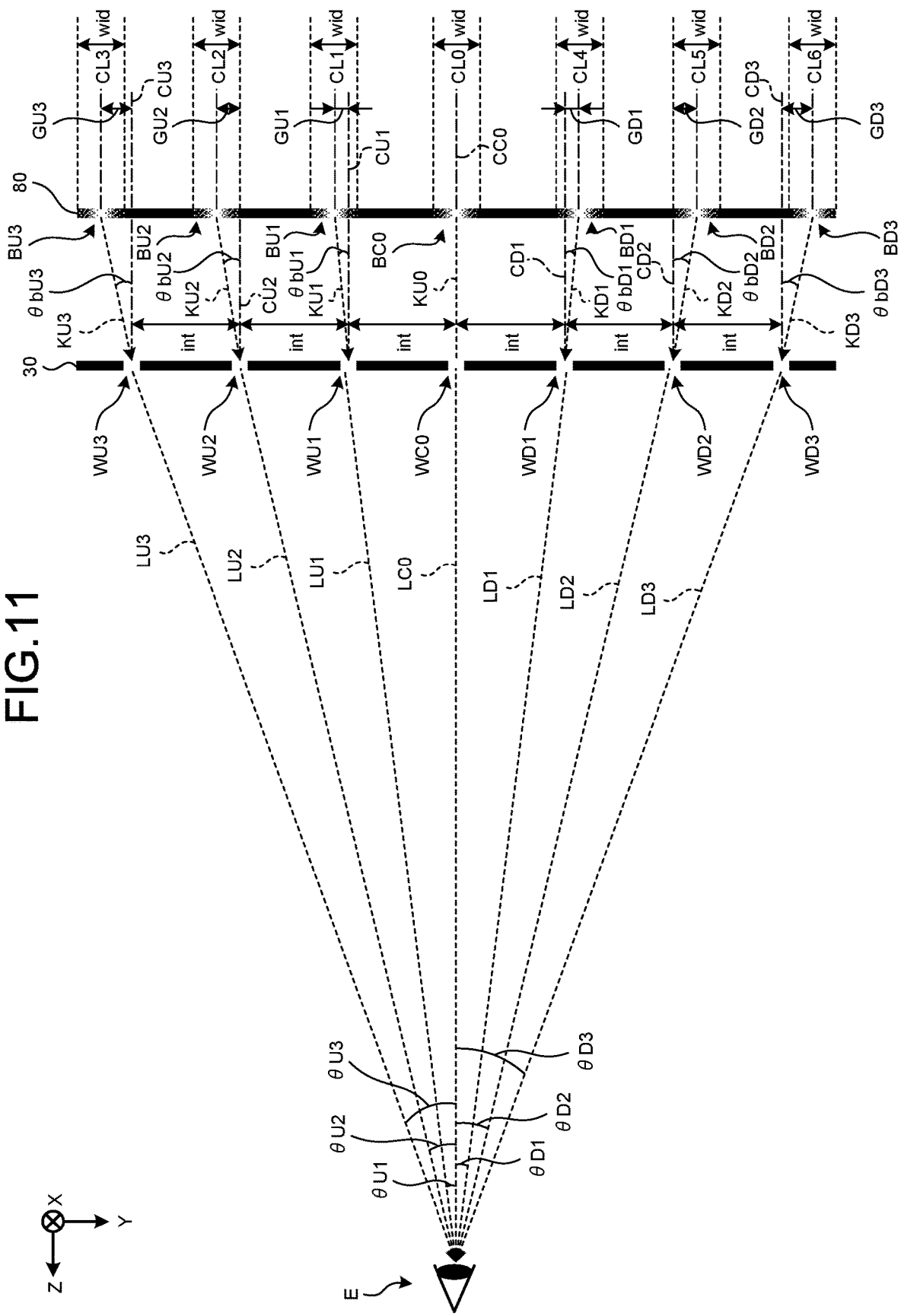
FIG. 11 is a schematic diagram illustrating states of the display panel and the light control panel of the display device generating light in an emission line from the display device to a viewpoint E of a user H illustrated in FIG. 10.

FIG. 11 is a schematic diagram illustrating states of the display panel 30 and the light control panel 80 of the display device 1 generating light emission lines LC0, LU1, LU2, LU3, LD1, LD2, and LD3 from the display device 1 to the viewpoint E of the user H illustrated in FIG. 10. The emission line LC0 illustrated in FIG. 11 is the emission line of light traveling through the visual line VC0 illustrated in FIG. 10. The emission line LU1 is the emission line of light traveling through the visual line VU1. The emission line LU2 is the emission line of light traveling through the visual line VU2. The emission line LU3 is the emission line of light traveling through the visual line VU3. The emission line LD1 is the emission line of light traveling through the visual line VD1. The emission line LD2 is the emission line of light traveling through the visual line VD2. The emission line LD3 is the emission line of light traveling through the visual line VD3. Hereinafter, for easiness of understanding, the light transmittance relation between a pixel 48 and a light control pixel 148 in the Y direction will be described below first in description with reference to FIG. 11.

The emission line LC0 is the emission line of light traveling through a white pixel WC0 of the display panel 30. The white pixel WC0 and white pixels WU1, WU2, WU3, WD1, WD2, and WD3 to be described later are each a pixel 48 having a transmittance set such that the color of the pixel 48 is recognized as, for example, white (W) at the highest luminance. For example, when red (R), green (G), and blue (B) gradation values indicated by a pixel signal included in the input signal IP are each expressed in eight bits, white (W) at the highest luminance has (R, G, B)=(255, 255, 255). In FIG. 11, pixels 48 except for the white pixels WC0, WU1, WU2, WU3, WD1, WD2, and WD3 among the pixels 48 included in the display panel 30 are controlled in accordance with a pixel signal of black (K) at the lowest luminance, for example, (R, G, B)=(0, 0, 0).

Light traveling through the emission line LC0 will be described first. The light traveling through the emission line LC0 is emitted from the light source device 50, transmits through a blurring area BC0 generated at the light control panel 80, and travels through an emission line KC0. The emission line KC0 is a light emission line connecting the center of the white pixel WC0 and the center of the blurring area BC0. The blurring area BC0 and blurring areas BU1, BU2, BU3, BD1, BD2, and BD3 to be described later are each an area that includes a plurality of light control pixels 148 and for which the light transmittance described above with reference to, for example, FIG. 6 is set.

Specifically, in the blurring area BC0, the light transmittance of each of the light control pixels 148 located within the blurring area wid that is centered at one light control pixel 148 as a center CL0 and extends in the X direction or the Y direction from the center CL0, is set to exceed zero as illustrated in the graph in FIG. 6.

Similarly, in the blurring area BU1, the light transmittance of each of the light control pixels 148 located within the blurring area wid that is centered at one light control pixel 148 as a center CL1 and extends in the X direction or the Y direction from the center CL1, is set to exceed zero.

Similarly, in the blurring area BU2, the light transmittance of each of the light control pixels 148 located within the blurring area wid that is centered at one light control pixel 148 as a center CL2 and extends in the X direction or the Y direction from the center CL2, is set to exceed zero.

Similarly, in the blurring area BU3, the light transmittance of each of the light control pixels 148 located within the blurring area wid that is centered at one light control pixel 148 as a center CL3 and extends in the X direction or the Y direction from the center CL3, is set to exceed zero.

Similarly, in the blurring area BD1, the light transmittance of each of the light control pixels 148 located within the blurring area wid that is centered at one light control pixel 148 as a center CL4 and extends in the X direction or the Y direction from the center CL4, is set to exceed zero.

Similarly, in the blurring area BD2, the light transmittance of each of the light control pixels 148 located within the blurring area wid that is centered at one light control pixel 148 as a center CL5 and extends in the X direction or the Y direction from the center CL5, is set to exceed zero.

Similarly, in the blurring area BD3, the light transmittance of each of the light control pixels 148 located within the blurring area wid that is centered at one light control pixel 148 as a center CL6 and extends in the X direction or the Y direction from the center CL6, is set to exceed zero.

The centers CL1, CL2, CL3, CL0, CL4, CL5, and CL6 correspond to the center CL1 described above with reference to FIG. 6. Hereinafter, each of the light control pixels 148 as the centers CL1, CL2, CL3, CL0, CL4, CL5, and CL6 is referred to as a center light control pixel.

The light transmittance of each of the light control pixels 148 positioned around the center light control pixel and included in the blurring area wid is higher, as the position of the light control pixel 148 is closer to the center light control pixel. Although not illustrated in detail, the light transmittance of each of the light control pixels 148 positioned in a direction (oblique direction) intersecting the X and Y directions relative to the center light control pixel is higher, as the position of the light control pixel 148 is closer to the center light control pixel, according to the same principle. Specifically, the light transmittance is set to be lowest (0) at any light control pixel 148 positioned outside a straight line or arc connecting an end part of the area determined by the blurring area wid in the X direction and an end part of the area determined by the blurring area wid in the Y direction, and the light transmittance is set to exceed zero at any light control pixel 148 positioned inside the straight line or arc.

As illustrated in the graph in FIG. 6, the light transmittance of a light control pixel 148 is highest (for example, 255) when the light control pixel 148 is positioned at the center CL0 of the blurring area BC0 in which light is transmitted on the back surface side of a pixel 48 controlled to be white (W) at the highest luminance like the white pixel WC0. When the center of the white pixel WC0 in the Y direction is a center CC0 illustrated in FIG. 11, the center CC0 and the center CL0 of the blurring area BC0 are at the same position in the Y direction. This is because the emission line LC0 aligns with the Z direction relative to the viewpoint E. Specifically, in a positional relation that the viewpoint E, the center CC0, and the center CL0 of the blurring area BC0 are arranged in the Z direction, light from the light source device 50 arrives at the viewpoint E through the blurring area BC0 and the white pixel WC0. Then, in this case, a blurring area formed by the blurring area BC0 reduces double images and partially missing images at the white pixel WC0. The emission line LC0 and the emission line KC0 align with the Z direction as well because of the positional relation that the viewpoint E, the center CC0, and the center CL0 of the blurring area BC0 are arranged in the Z direction.

Under an ideal condition, neither double image nor partially missing image occurs even with no blurring area as long as the viewpoint E, the center CC0, and the center CL0 of the blurring area BC0 are arranged in the Z direction. However, in reality, such a strict relative positional relation is not completely achieved between the user H and the display device 1 as an ideal positional relation, and thus, a blurring area is effective in reducing double images and a partially missing images.

The following describes light traveling through the emission line LU1. The light traveling through the emission line LU1 is emitted from the light source device 50, transmits through the blurring area BU1 generated at the light control panel 80, and travels through an emission line KU1. The emission line KU1 is a light emission line connecting the center of the white pixel WU1 and the center of the blurring area BU1.

As described above with reference to FIG. 5, refraction occurs due to the refractive index difference between the multilayered structure between the light control pixels 148 and the pixels 48 and the air on the emission surface side (the viewpoint E side) of the display panel 30. Thus, in the first embodiment, an angle θbU1 of the emission line KU1 relative to the Z direction is set so that a difference based on the refractive index difference occurs between the angle θbU1 and the angle θU1 of the white pixel WU1 relative to the Z direction (the white pixel WC0). In other words, in the first embodiment, the position of the blurring area BU1 in the Y direction is determined so that the angle θbU1 becomes an angle that is set relative to the angle θUI based on the refractive index difference. When the center of the white pixel WU1 in the Y direction is a center CU1 illustrated in FIG. 11, such position determination of the blurring area BU1 in the Y direction provides a positional shift GU1 in the Y direction between the center CU1 and the center CL1 of the blurring area BU1. In other words, in the first embodiment, the position of a light control pixel 148 corresponding to the center CL1 of the blurring area BU1 is determined based on the refractive index difference so that a positional shift corresponding to the positional shift GU1 occurs relative to the white pixel WU1, and a blurring area centered at the determined light control pixel 148 is set. The centers CU1, CU2, CU3, CD1, CD2, and CD3 in FIG. 11 correspond to a normal CP in FIG. 12.

The following describes light traveling through the emission line LU2. The light traveling through the emission line LU2 is emitted from the light source device 50, transmits through the blurring area BU2 generated at the light control panel 80, and travels through an emission line KU2. The emission line KU2 is a light emission line connecting the center of the white pixel WU2 and the center of the blurring area BU2.

As described above with reference to FIG. 5, refraction occurs due to the refractive index difference between the multilayered structure between the light control pixels 148 and the pixels 48 and the air on the emission surface side (the viewpoint E side) of the display panel 30. Thus, in the first embodiment, an angle θbU2 of the emission line KU2 relative to the Z direction is set so that a difference based on the refractive index difference occurs between the angle θbU2 and the angle θU2 of the white pixel WU2 relative to the Z direction (the white pixel WC0). In other words, in the first embodiment, the position of the blurring area BU2 in the Y direction is determined so that the angle θbU2 becomes an angle that is set relative to the angle θU2 based on the refractive index difference. When the center of the white pixel WU2 in the Y direction is the center CU2 illustrated in FIG. 11, such position determination of the blurring area BU2 in the Y direction provides a positional shift GU2 in the Y direction between the center CU2 and the center CL2 of the blurring area BU2. In other words, in the first embodiment, the position of a light control pixel 148 corresponding to the center CL2 of the blurring area BU2 is determined based on the refractive index difference so that a positional shift corresponding to the positional shift GU2 occurs relative to the white pixel WU2, and a blurring area centered at the determined light control pixel 148 is set.

Light traveling through an emission line LUp will be described below based on the same principle as the emission lines LU1 and LU2 described above. In description of light traveling through the emission line LUp, "p" is a numerical value and, for example, any natural number of one to three. In a case of p=3, the emission line LUp is the emission line LU3 illustrated in FIG. 11. The same "p" is used in a term, such as an emission line KUp to be described later, which appears in description of light traveling through the emission line LUp. The light traveling through the emission line LUp is emitted from the light source device 50, transmits through a blurring area BUp generated at the light control panel 80, and travels through the emission line KUp. The emission line KUp is a light emission line connecting the center of a white pixel WUp and the center of the blurring area BUp.

In the first embodiment, an angle θbUp of the emission line KUp relative to the Z direction is set so that a difference based on the refractive index difference described above with reference to FIG. 5 occurs between the angle θbUp and an angle θUp of the white pixel WUp relative to the Z direction (the white pixel WC0). In other words, in the first embodiment, the position of the blurring area BUp in the Y direction is determined so that the angle θbUp becomes an angle that is set relative to the angle θUp based on the refractive index difference. When the center of the white pixel WUp in the Y direction is a center CUp illustrated in FIG. 11, such position determination of the blurring area BUp in the Y direction provides a positional shift GUp in the Y direction between the center CUp and the center of the blurring area BUp. In other words, in the first embodiment, the position of a light control pixel 148 corresponding to the center of the blurring area BUp is determined based on the refractive index difference so that a positional shift corresponding to the positional shift GUp occurs relative to the white pixel WUp, and a blurring area centered at the determined light control pixel 148 is set.

Light traveling through an emission line LDq will be described below based on the same principle as the emission line LUp. As with "p" in the above description, "q" in description of light traveling through the emission line LDq is a numerical value and, for example, any natural number of one to three. The same "q" is used in a term, such as an emission line KDq to be described later, which appears in description of light traveling through the emission line LDq. The light traveling through the emission line LDq is emitted from the light source device 50, transmits through a blurring area BDq generated at the light control panel 80, and travels through the emission line KDq. The emission line KDq is a light emission line connecting the center of a white pixel WDq and the center of the blurring area BDq.

In the first embodiment, an angle θbDq of the emission line KDq relative to the Z direction is set so that a difference based on the refractive index difference described above with reference to FIG. 5 occurs between the angle θbDq and an angle θDq of the white pixel WDq relative to the Z direction (the white pixel WC0). In other words, in the first embodiment, the position of the blurring area BDq in the Y direction is determined so that the angle θbDq becomes an angle that is set relative to the angle θDq based on the refractive index difference. When the center of the white pixel WDq in the Y direction is a center CDq illustrated in FIG. 11, such position determination of the blurring area BDq in the Y direction provides a positional shift GDq in the Y direction between the center CDq and the center of the blurring area BDq. In other words, in the first embodiment, the position of a light control pixel 148 corresponding to the center of the blurring area BDq is determined based on the refractive index difference so that a positional shift corresponding to the positional shift GDq occurs relative to the white pixel WDq, and a blurring area centered at the determined light control pixel 148 is set.

In FIG. 11, the distance between the centers CC0 and CU1 in the Y direction, the distance between the centers CU1 and CU2 in the Y direction, and the distance between the centers CU2 and CU3 in the Y direction are equal to a distance int. Since the display panel 30 and the light control panel 80 are parallel to each other, the distance between the white pixel WC0 and the blurring area BC0 in the Z direction, the distance between the white pixel WU1 and the blurring area BU1 in the Z direction, the distance between the white pixel WU2 and the blurring area BU2 in the Z direction, and the distance between the white pixel WU3 and the blurring area BU3 in the Z direction are equal to one another and correspond to the gap G described above with reference to, for example, FIG. 5. The angle θU2 is larger than the angle θU1. The angle θU3 is larger than the angle θU2. Thus, although the refractive index difference described above with reference to FIG. 5 is applied, a coefficient (for example, a relative refractive index difference n to be described later) of correction for applying the refractive index difference does not change with the position in the Y direction, and therefore, the angle θbU2 is larger than the angle θbU1. The angle θbU3 is larger than the angle θbU2. Thus, the positional shift GU2 that occurs in accordance with the angle θbU2 is larger than the positional shift GU1 that occurs in accordance with the angle θbU1. The positional shift GU3 that occurs in accordance with the angle θbU3 is larger than the positional shift GU2 that occurs in accordance with the angle θbU2.

Such a condition is set that pixels 48 transmitting light are disposed at predetermined intervals (for example, at intervals of the distance int) in the Y direction with respect to the position of a pixel 48 (for example, the white pixel WC0) in the Y direction at a position opposing the viewpoint E in the direction normal to the image display surface of the display device 1. The above-described white pixels WC0, WU1, WU2, and WU3 correspond to pixels 48 disposed in accordance with the condition. Description is made on a case in which an optical material having substantially the same light refractive index as that due to the air around the display device 1 is employed as the multilayered structure between the display panel 30 and the light control panel 80. In this case, the distance between the central position of a pixel 48 that transmits light on an X-Y plane and the center CL of the blurring area wid generated in correspondence with the pixel 48 on an X-Y plane is longer as the distance between the pixel 48 and a visual line passing through the viewpoint E and extending in the direction (Z direction) normal to the display panel 30 is longer.

In generalization by using "p" described above, the positional shift GU(p+1) is larger than the positional shift GUp when the display panel 30 and the light control panel 80 are parallel to each other and the distance between the centers CC0 and CU1 in the Y direction is equal to the distance between the centers CUp and CU(p+1) in the Y direction. When the positional shift GU2 is more than twice the positional shift GU1, the distance between the blurring areas BU(p+1) and BU(p+2) in the Y direction is longer than the distance between the blurring areas BUp and BU(p+1) in the Y direction.

In FIG. 11, the distance between the centers CC0 and CD1 in the Y direction, the distance between the centers CD1 and CD2 in the Y direction, and the distance between the centers CD2 and CD3 in the Y direction is equal to the distance int. Since the display panel 30 and the light control panel 80 are parallel to each other, the distance between the white pixel WC0 and the blurring area BC0 in the Z direction, the distance between the white pixel WD1 and the blurring area BD1 in the Z direction, the distance between the white pixel WD2 and the blurring area BD2 in the Z direction, and the distance between the white pixel WD3 and the blurring area BD3 in the Z direction are equal to one another and correspond to the gap G described above with reference to, for example, FIG. 5. The angle θD2 is larger than the angle θD1. The angle θD3 is larger than the angle θD2. Thus, although the refractive index difference described above with reference to FIG. 5 is applied, a coefficient (for example, the ratio between $n_1$ and $n_2$ described above) of correction for applying the refractive index difference does not change with the position in the Y direction, and therefore, the angle θbD2 is larger than the angle θbD1. The angle θbD3 is larger than the angle θbD2. Thus, the positional shift GD2 that occurs in accordance with the angle θbD2 is larger than the positional shift GD1 that occurs in accordance with the angle θbD1. The positional shift GD3 that occurs in accordance with the angle θbD3 is larger than the positional shift GD2 that occurs in accordance with the angle θbD2.

Such a condition is set that pixels 48 transmitting light are disposed at predetermined intervals (for example, at intervals of the distance int) in the Y direction with respect to the position of a pixel 48 (for example, the white pixel WC0) in the Y direction at a position opposing the viewpoint E in the direction normal to the image display surface of the display device 1. The white pixels WC0, WD1, WD2, and WD3 described above correspond to pixels 48 disposed in accordance with the condition.

In generalization by using "q" described above, the positional shift GD(q+1) is larger than the positional shift GDq when the display panel 30 and the light control panel 80 are parallel to each other and the distance between the centers CC0 and CD1 in the Y direction is equal to the distance between the centers CDq and CD(q+1) in the Y direction. When the positional shift GD2 is more than twice the positional shift GD1, the distance between the blurring areas BD(q+1) and BD(q+2) in the Y direction is longer than the distance between the blurring areas BDq and BD(q+1) in the Y direction.

In this manner, when any pixel 48 is controlled to transmit light in accordance with an input image signal, the blurring processing by which a plurality of light control pixels 148 is controlled to transmit light is applied, and a blurring area (for example, the blurring area wid; refer to FIGS. 6 and 11) including a plurality of light control pixels to which the blurring processing is applied is formed. The pixel 48 is, for example, the white pixel WU1, WU2, WU3, WD1, WD2, or WD3 illustrated in FIG. 11. When light from the light source device 50 transmits through the blurring area and the pixel 48 and is emitted to the user (user H) side of the display panel 30, and when the pixel 48 is not positioned on a visual line (for example, the emission line LC0 illustrated in FIG. 11) along a normal to the first panel from a predetermined viewpoint (the viewpoint E) of the user H, the center of the blurring area generated in correspondence with the pixel 48 not positioned on the visual line is at a position shifted to a side opposite to the visual line side relative to the normal to the display panel 30 passing through the center of the pixel 48 (for example, the center CU1, CU2, CU3, CD1, CD2, or CD3 illustrated in FIG. 11). Assuming that a reference normal denotes the normal (for example, the emission line LC0) to the display panel 30 passing through the user viewpoint E. When a straight line (for example, the emission line LUp or LDq) connecting the viewpoint E and the pixel 48 controlled to transmit light in the display panel 30 has an angle (for example, θUp or θDq) relative to the normal to the display panel 30, the center CL of the blurring area wid corresponding to the pixel 48 is at a position shifted to a side opposite to the reference normal side on which the reference normal is positioned, relative to the normal to the display panel 30 traveling through the center (for example, the center CUp or CDq) of the pixel 48. The amount of shift between the center of the blurring area generated when a pixel 48 not positioned on the reference normal is controlled to transmit light and the normal to the display panel 30 passing through the center of the pixel 48 is larger as the distance between the pixel 48 and the reference normal is longer. Specifically, the positional shift GU3 is larger than the positional shifts GU1 and GU2. The positional shift GU2 is larger than the positional shift GU1. The positional shift GD3 is larger than the positional shifts GD1 and GD2. The positional shift GD2 is larger than the positional shift GD1. The amount of shift between the center (center CL) of the blurring area generated when a pixel 48 not positioned on the reference normal is controlled to transmit light and the normal to the display panel 30 passing through the center of the pixel 48 (for example, the emission line LC0) depends on first to third factors described below. The first factor is the distance (distance d illustrated in FIG. 12 to be described later) between a predetermined viewpoint (viewpoint E) of a user (user H) and the display panel 30. The second factor is the relative refractive index difference (n to be described later) between air around the display device 1 and an optical member (for example, the second polarizer P2, the third polarizer P3, or the diffusion layer P5 illustrated in FIG. 2) provided between the first panel (the display panel 30) and a second panel (the light control panel 80). The third factor is the distance between the normal to the display panel 30 passing through the viewpoint and the pixel 48.

Since the distance between the centers CC0 and CU1 in the Y direction and the distance between the centers CC0 and CD1 in the Y direction are both equal to the distance int, the angles θU1 and θD1 are equal to each other. Thus, the angles θbU1 and θbD1 are equal to each other. In addition, the positional shifts GU1 and GD1 are equal to each other. In generalization by using the above-described "p" and "q", in a case of p=q, the angles θUp and θDq are equal to each other, the angles θbUp and θbDq are equal to each other, and the positional shifts GUp and GDq are equal to each other.

Figure 12:
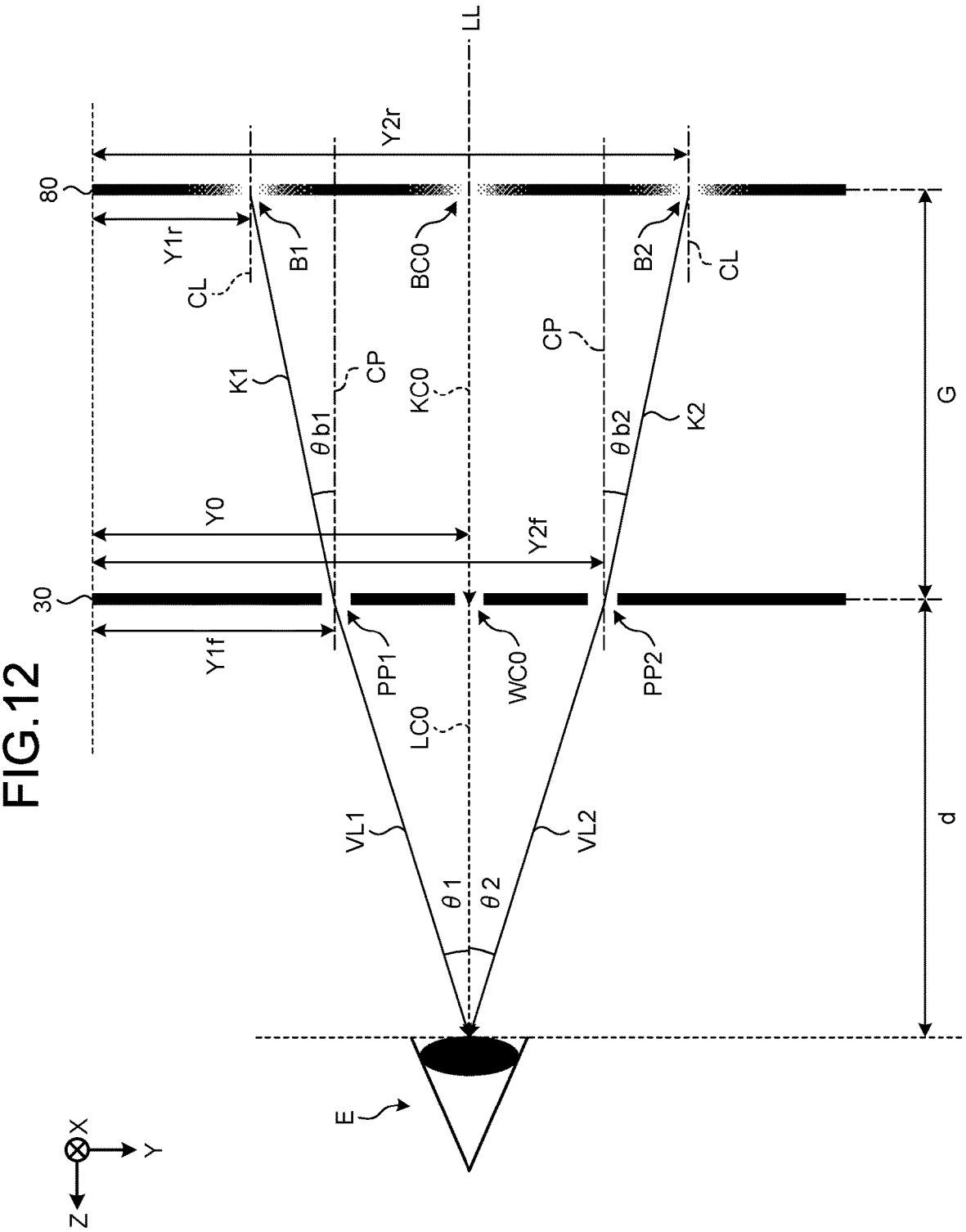
FIG. 12 is a diagram illustrating the principle of calculation of a distance as a reference of position determination of a blurring area corresponding to a pixel.

The following describes calculation related to position determination of the blurring area corresponding to the position of a pixel 48 controlled to transmit light with reference to FIG. 12.

FIG. 12 is a diagram illustrating the principle of calculation of a distance Y1r as a position determination reference for a blurring area B1 corresponding to a pixel PP1 and calculation of a distance Y2r as a position determination reference for a blurring area B2 corresponding to a pixel PP2.

As illustrated in FIG. 12, the distance between the middle position of the display panel 30 in the Z direction and the viewpoint E of the user H in the Z direction is represented by d. A position in the Y direction at which a normal to the display panel 30 reaches the viewpoint E is at a distance Y0 from one end side of the display panel 30 in the Y direction. In FIG. 12, the "position in the Y direction at which a normal to the display panel 30 reaches the viewpoint E" is illustrated as the optical axis LL on which the emission line LC0 and the emission line KC0 overlap each other.

The following first describes a case in which the pixel PP1 that is a pixel 48 at a distance shorter than the distance Y0 from the one end side of the display panel 30 in the Y direction is controlled to transmit light. The distance of the pixel PP1 illustrated in FIG. 12 from the one end side of the display panel 30 in the Y direction is a distance Y1$f$. When an angle θ1 is the angle between the emission line LC0 and a light emission line VL1 illustrated with a straight line connecting the viewpoint E and the center of the pixel PP1 in the Y direction, the angle θ1 can be expressed by Expression (4) below.

$$\theta 1 = \tan^{-1}\left(\frac{Y0 - Y1f}{d}\right) \quad (4)$$

With taken into consideration the refractive index difference between the multilayered structure between the display panel 30 and the light control panel 80 and air on the emission surface side (the viewpoint E side) of the display panel 30, an emission line K1 illustrated in FIG. 12 is a light emission line assumed between the display panel 30 and the light control panel 80 when light from the light source device 50 passes through the center of the blurring area B1 of the light control panel 80 in the Y direction and passes through the emission line VL1. An angle θ1$b$ is the angle between the normal CP extending in the Y direction and the emission line K1. The relative refractive index of the display device 1 for air is represented by n. The relative refractive index of the display device 1 is, for example, the relative refractive index of "the multilayered structure (the second polarizer P2, the diffusion layer P5, and the third polarizer P3) between the light control pixel 148 and the pixels 48" for air. The relation between sin θ1 and sin θ1$b$ can be expressed by Expression (5) based on such definition of n and Snell's law, which expresses the relation among incident angle, refraction angle, and traveling wave propagation speeds within two media in a general wave refraction phenomenon.

1.0*sin θ1=$n$*sin θ$b$1 (5)

An angle θ$b$1 can be expressed by Expression (6) below based on Expression (5) above.

$$\theta b1 = \sin^{-1}\left(\frac{\sin\theta 1}{n}\right) \quad (6)$$

The distance between the middle position of the display panel 30 in the Y direction and the middle position of the light control panel 80 in the Y direction is the gap G described above. When the distance Y1$r$ is the distance between the center of the blurring area B1 in the Y direction and one end side of the light control panel 80 in the Y direction, the distance Y1$r$ can be expressed by Expression (7) below.

Y1$r$=Y1$f$−G*tan(θ$b$1) (7)

A straight line connecting the one end side of the display panel 30 in the Y direction and the one end side of the light control panel 80 in the Y direction extends in the Y direction as illustrated in FIG. 12. Thus, the Y-directional coordinate of the center of the blurring area B1 in the Y direction can be calculated from the Y-directional coordinate of the pixel PP1 based on the ratio of the distance Y1$r$ calculated with reference to Expressions (4) to (7) and the above-described distance Y1$f$. Specifically, when the Y-directional coordinate of the pixel PP1 is the distance Y1$f$, the Y-directional coordinate of the center of the blurring area B1 in the Y direction is the distance Y1$r$.

The following describes a case in which the pixel PP2 that is a pixel 48 at a distance longer than the distance Y0 from the one end side of the display panel 30 in the Y direction is controlled to transmit light. The distance of the pixel PP2 illustrated in FIG. 12 from the one end side of the display panel 30 in the Y direction is a distance Y2$f$. When an angle θ2 is the angle between the emission line LC0 and a light emission line VL2 illustrated with a straight line connecting the viewpoint E and the center of the pixel PP2 in the Y direction, the angle θ2 can be expressed by Expression (8) below.

$$\theta 2 = \tan^{-1}\left(\frac{Y2f - Y0}{d}\right) \quad (8)$$

With taken into consideration the refractive index difference between the multilayered structure between the display panel 30 and the light control panel 80 and air on the emission surface side (the viewpoint E side) of the display panel 30, an emission line K2 illustrated in FIG. 12 is a light emission line assumed between the display panel 30 and the light control panel 80 when light from the light source device 50 passes through the center of the blurring area B2 of the light control panel 80 in the Y direction and passes through the emission line VL2. An angle θ12$b$ is the angle between the normal CP extending in the Y direction and the emission line K2. Expression (5) above also is satisfied when θ1 is replaced with θ2 and θ1$b$ is replaced with θ2$b$ in Expression (5). Thus, an angle θ$b$2 can be expressed by Expression (9) below based on Expression (5) above.

$$\theta b2 = \sin^{-1}\left(\frac{\sin\theta 2}{n}\right) \quad (9)$$

When the distance Y2$r$ is the distance between the center of the blurring area B2 in the Y direction and the one end side of the light control panel 80 in the Y direction, the distance Y2$r$ can be expressed by Expression (10) below.

Y2$r$=Y2$f$+G*tan(θ$b$2) (10)

The Y-directional coordinate of the center of the blurring area B2 in the Y direction can be calculated from the Y-directional coordinate of the pixel PP2 based on the ratio of the distance Y2$r$ calculated with reference to Expressions (8) to (10) and the above-described distance Y2$f$. Specifically, when the Y-directional coordinate of the pixel PP2 is the distance Y2$f$, the Y-directional coordinate of the center of the blurring area B2 in the Y direction is the distance Y2$r$.

Strictly speaking, it is technically difficult to make the multilayered structures of the display panel 30 and the light control panel 80 completely uniform irrespective of the position in the Y direction, n may be the average relative refractive index of the "multilayered structure (the second polarizer P2, the diffusion layer P5, and the third polarizer P3) between the light control pixel 148 and the pixels 48" for air.

The Y-directional coordinate of the center of the blurring area BU1 in the Y direction described above with reference to FIG. 11 can be calculated from the Y-directional coordinate of the white pixel WU1 based on Expressions (4), (5), (6), and (7). Specifically, the angle θU1 illustrated in FIG. 11 is substituted into the angle θ1 in Expressions (4), (5), and (6), and the Y-directional coordinate of the white pixel WU1 is substituted into the distance Y1$f$ in Expression (4). An angle θU1$b$ illustrated in FIG. 11 is the angle θ1$b$ in Expressions (5), (6), and (7). Similarly, the Y-directional coordinate of the center of the blurring area BU2 in the Y direction can be calculated from the Y-directional coordinate of the white pixel WU2. In addition, the Y-directional coordinate of the center of the blurring area BU3 in the Y direction can be calculated from the Y-directional coordinate of the white pixel WU3.

The Y-directional coordinate of the center of the blurring area BD1 in the Y direction described above with reference to FIG. 11 can be calculated from the Y-directional coordinate of the white pixel WD1 based on Expressions (8), (9), and (10). Specifically, the angle θD1 illustrated in FIG. 11 is substituted into the angle θ2 in Expressions (8) and (9), and the Y-directional coordinate of the white pixel WD1 is substituted into the distance Y2$f$ in Expression (8). An angle θD1$b$ illustrated in FIG. 11 is the angle θ2$b$ in Expressions (9) and (10). Similarly, the Y-directional coordinate of the center of the blurring area BD2 in the Y direction can be calculated from the Y-directional coordinate of the white pixel WD2. In addition, the Y-directional coordinate of the center of the blurring area BD3 in the Y direction can be calculated from the Y-directional coordinate of the white pixel WD3.

Information indicating the Y-directional coordinate of each of the white pixels WU1, WU2, WU3, WD1, WD2, and WD3 is included in the input signal IP. Information indicating the distance Y0 illustrated in FIG. 12, the distance d, the gap G, and the relative refractive index (n) is stored in the visual information holder 12 in advance. The distance Y0 and the distance d function as relative position information related to the positional relation between the viewpoint E of the user H and the display panel 30. The coordinate determiner 13 refers to the relative position information and information indicating the gap G and the relative refractive index (n), which are stored in the visual information holder 12, and derives the center coordinates of a blurring area in which the center CL of the blurring area wid corresponding to the coordinates of a pixel 48 controlled to transmit light in accordance with the input signal IP is positioned, based on expressions necessary for derivation of the center coordinates among Expressions (4), (5), (6), (7), (8), (9), and (10). Although not described in detail, the coordinate determiner 13 has a function to derive the coordinates of the pixels 48 and the light control pixels 148 from the distances Y1$f$, Y2$f$, Y1$r$, Y2$r$, and Y0 based on the relation among values such as the distances Y1$f$, Y2$f$, Y1$r$, Y2$r$, and Y0 and disposition pitches of the pixels 48 and the light control pixels 148. Specifically, data indicating the relation among the values of these distances and the coordinates of the pixels 48 and the light control pixels 148 is held in a storage circuit that can be referred by the coordinate determiner 13. The storage circuit is included in the signal processor 10.

When the display device 1 is employed as an image display device including an image display surface that is significantly large for the user H, a visual line (for example, the visual line VC0 illustrated in FIG. 10) through which the user H squarely views, in the Z direction, the image display surface of the display device 1 along the X-Y plane is assumed at installation of the display device 1 in advance. Specifically, the distance Y0 in FIG. 12 can be assumed and determined in advance based on the position (height of the head of the user H in FIG. 10) of the viewpoint E in the Y direction illustrated in FIG. 11. Although not illustrated in FIGS. 10 and 11, the distance d illustrated in FIG. 12 can be assumed and determined at installation of the display device 1 in advance. The gap G and the relative refractive index (n) are determined at designing of the display device 1. In this manner, information indicating the distance Y0, the distance d, and the gap G that are determined in advance is stored in the visual information holder 12 in advance.

The emission line LC0 illustrated in FIG. 12 can be specified based on the distance Y0 and the distance d stored in the visual information holder 12. Specifically, the emission line LC0 illustrated in FIG. 11 and the visual line VC0 illustrated in FIG. 10 can be specified based on the distance Y0 and the distance d stored in the visual information holder 12. In addition, the relation between the Y-directional coordinate of the pixel PP1 and the Y-directional center coordinate of the blurring area B1 and the relation between the Y-directional coordinate of the pixel PP2 and the Y-directional center coordinate of the blurring area B2 can be calculated by referring to the gap G stored in the visual information holder 12 and using Expression (4), (5), (6), (7), (8), (9), and (10) above. Specifically, through the above-described substitution, the Y-directional center coordinate of each of the blurring areas BU1, BU2, BU3, BD1, BD2, and BD3 can be calculated from the Y-directional coordinate of each of the white pixels WU1, WU2, WU3, WD1, WD2, and WD3.

The same principle in description of the Y direction with reference to FIGS. 10 to 12 is applicable to the X direction. Specifically, the "Y direction" described above with reference to FIGS. 10 to 12 is replaced with the "X direction". Accordingly, when the display device 1 is employed as an image display device including an image display surface that is significantly large for the user H, it is possible to perform position determination of the center coordinates of the blurring area in the X direction as well by assuming a visual line through which the user H squarely views, in the Z direction, the image display surface of the display device 1 along the X-Y plane. The center coordinates of the blurring area are "the center coordinates of a blurring area that allows an emission line of light arriving at the viewpoint E through a pixel 48 controlled to transmit light".

In FIG. 10, the visual line VC0 arrives at the center of the display device 1 in the Y direction, but the arrival position of the visual line VC0 is not limited to the center of the display device 1. The arrival position of the visual line VC0 may be inside or outside the display region OA of the display panel 30. When the arrival position of the visual line VC0 is outside the display region OA, the arrival position of the visual line VC0 at a virtual enlarged surface obtained by virtually enlarging the image display surface of the display panel 30 along the X-Y plane can be handled as the position of a virtual pixel 48 on a visual line from a predetermined viewpoint of the user H along a normal to the display panel 30. In this case, an arrival position at an end part opposing the viewpoint E among end parts of the emission line LC0 may be a position on a virtual enlarged surface obtained by virtually enlarging the image display surface of the display panel 30 along the X-Y plane.

Although the "positional relation between the coordinates of a pixel 48 that transmits light and the center coordinates of a blurring area" is described above with reference to FIGS. 10 and 11 with an example in which the display device 1 is employed as an image display device including an image display surface that is significantly large for the user H, the "positional relation between the coordinates of a pixel 48 that transmits light and the center coordinates of a blurring area" may be determined in any other example based on the same principle. For example, the "positional relation between the coordinates of a pixel 48 that transmits light and the center coordinates of a blurring area", which is described above with reference to FIGS. 10 and 11, is also applicable to the display device 1 (such as a large-sized tablet display device) with which a visual line (light emission line) connecting each pixel 48 and the viewpoint E has a significantly different angle since the user H is close to the image display surface of the display device 1. Moreover, the "positional relation between the coordinates of a pixel 48 that transmits light and the center coordinates of a blurring area", which is described above with reference to FIGS. 10 and 11, is not limited to public viewing but is also applicable to a display device such as a large-sized (for example, 40 inches or larger) television display.

The above description with reference to FIGS. 10 and 11 is made on the first embodiment in which the "positional relation between the coordinates of a pixel 48 that transmits light and the center coordinates of a blurring area" is individually calculated for each pixel 48.

Second Embodiment

Figure 13:
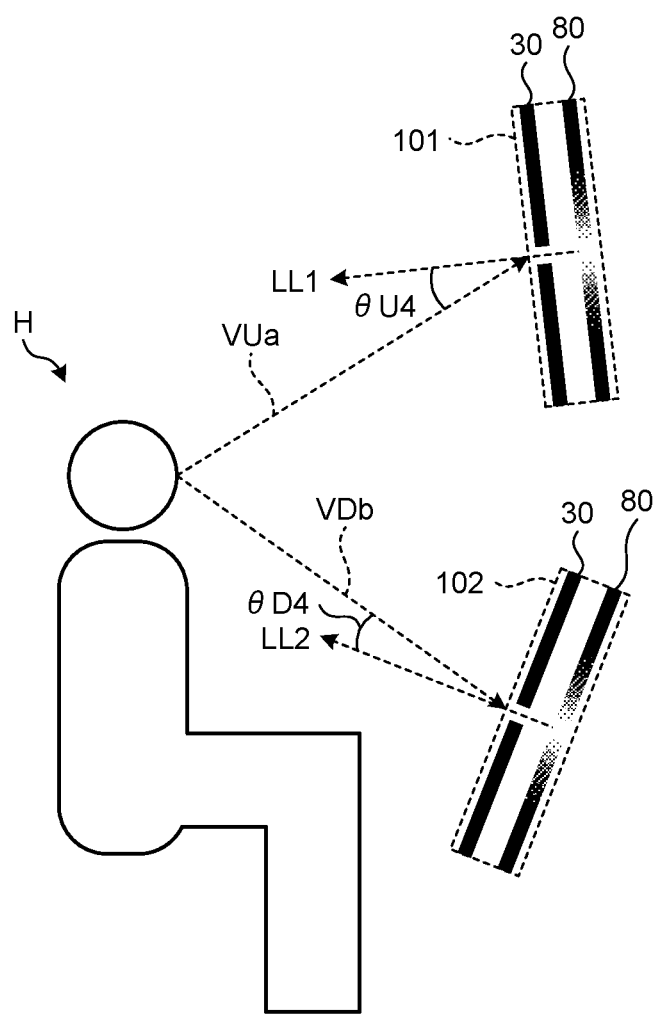
FIG. 13 is a schematic diagram illustrating the relation between the display device and the user and illustrating a visual line from the user to the display device.
Figure 14:
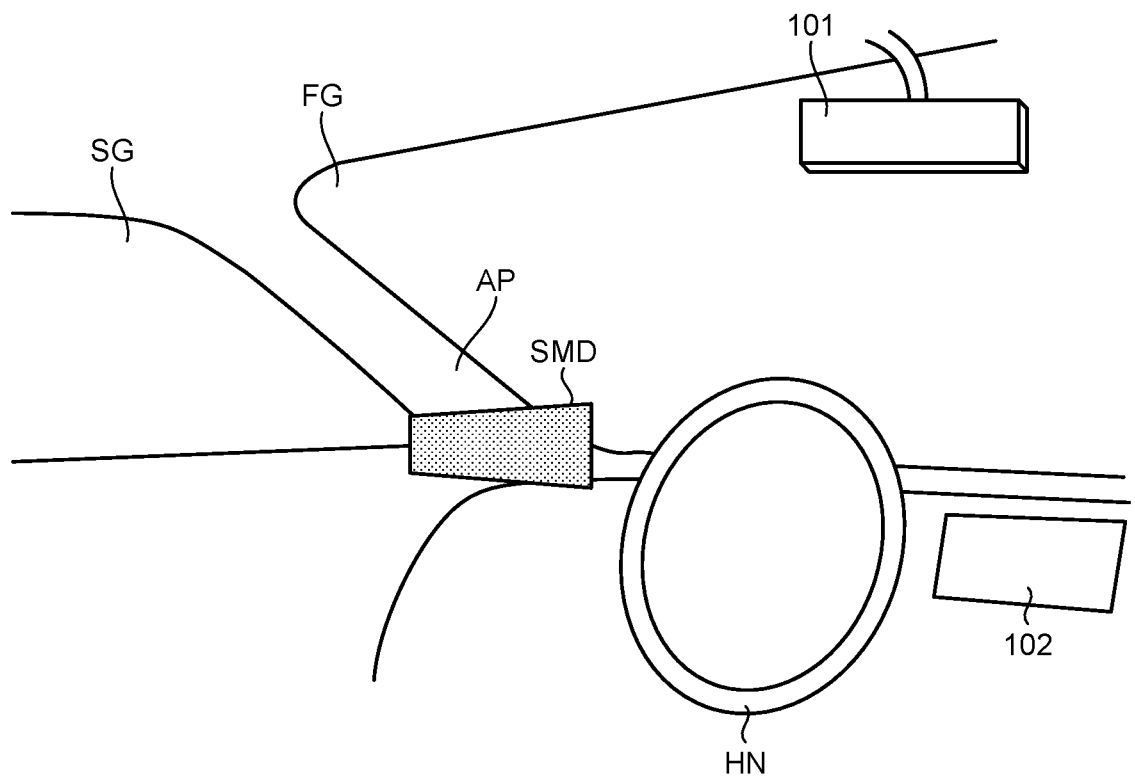
FIG. 14 is a schematic diagram illustrating exemplary installation of a four-wheel automobile including the display device.

The following describes, with reference to FIGS. 13 and 14, a case in which the "positional relation between the coordinates of a pixel 48 that transmits light and the center coordinates of a blurring area" is handled as a common positional relation among a plurality of pixels 48. The second embodiment corresponds to a case in which the relative positional relation with the user H is managed for each display device 1. In the second embodiment, a blurring area for each of the pixels 48 included in the display device 1 is a common blurring area with taken into account the relative positional relation between the display device 1 and the user H. The second embodiment had the same configuration as the first embodiment except for features described below.

FIG. 13 is a schematic diagram illustrating the relation between the user H and display devices 101 and 102 and illustrating visual lines VUa and VDb from the user H to the display devices 101 and 102. FIG. 13 exemplarily illustrates the positional relation between the display device 101 and the user H in which the visual line VUa from the user H to the image display surface of the display device 101 arrives at the center of the display device 101 in the Y direction. FIG. 13 also exemplarily illustrates the positional relation between the display device 102 and the user H in which the visual line VDb from the user H to the image display surface of the display device 102 arrives at the center of the display device 102 in the Y direction. The display devices 101 and 102 each have the same configuration as the display device 1 described above with reference to FIGS. 1 to 9 and each include the display panel 30 and the light control panel 80. However, the angle difference among visual lines from the user H to the respective pixels 48 in each of the display devices 101 and 102 is negligibly small unlike the display device 1 described above with reference to FIGS. 10 and 11.

A visual line VU4 has an angle $\theta U4$ relative to the normal LL1 to the display panel 30 passing through the center of the display device 101 in the Y direction as illustrated in FIG. 13. Thus, the "positional relation between the coordinates of a pixel 48 that transmits light and the center coordinates of a blurring area", which corresponds to the position of the display device 101 relative to the user H and the angle $\theta U4$ can be derived by substituting the angle $\theta U4$ into the angle $\theta 1$ in Expressions (6) and (7) above. Specifically, when the Y-directional coordinate of a pixel 48 controlled to transmit light is specified based on the input signal IP input to the display device 101, the Y-directional center coordinate of a blurring area that allows the emission line of light arriving at the viewpoint E of the user H passing through the pixel 48 can be derived as the distance Y1$r$ in Expression (7) by handling the Y-directional coordinate as the distance Y1$f$. In other words, in the display device 101, Expression (4) is not individually applied to each pixel 48 controlled to transmit light among all pixels 48 included in the display panel 30, but a result obtained by substituting the angle $\theta U4$ into the angle $\theta 1$ in Expression (6) is applied in common.

The visual line VDb has an angle $\theta D4$ relative to the normal LL2 to the display panel 30 passing through the center of the display device 102 in the Y direction as illustrated in FIG. 13. Thus, the "positional relation between the coordinates of a pixel 48 that transmits light and the center coordinates of a blurring area", which corresponds to the position of the display device 102 relative to the user H and the angle $\theta D4$ can be derived by substituting the angle $\theta D4$ into the angle $\theta 2$ in Expressions (9) and (10) above. Specifically, when the Y-directional coordinate of a pixel 48 controlled to transmit light is specified based on the input signal IP input to the display device 102, the Y-directional center coordinate of a blurring area that allows the emission line of light arriving at the viewpoint E of the user H passing through the pixel 48 can be derived as the distance Y2$r$ in Expression (7) by handling the Y-directional coordinate as the distance Y2$f$. In other words, in the display device 102, Expression (8) is not individually applied to each pixel 48 controlled to transmit light among all pixels 48 included in the display panel 30, but a result obtained by substituting the angle $\theta D4$ into the angle $\theta 2$ in Expression (9) is applied in common.

In the display device 1 described above with reference to FIGS. 10 and 11, information indicating the distance Y0 and the distance d in Expressions (4) and (8) is stored in the visual information holder 12, but this information can be omitted in the display devices 101 and 102 described above with reference to FIG. 13. Specifically, the angle $\theta 1$ in Expression (6) (the angle $\theta U4$ illustrated in FIG. 13) or the angle $\theta 2$ in Expression (9) (the angle $\theta D4$ illustrated in FIG. 13) may be stored in the visual information holder 12 in place of the information indicating the distance Y0 and the distance d. The gap G and the relative refractive index (n) are stored in the visual information holder 12 included in each of the display devices 101 and 102 described above with reference to FIG. 13. The angles $\theta U4$ and $\theta D4$ function as relative position information related to the positional relation between the viewpoint E of the user H and the display panel 30.

In this manner, the angle of a visual line from the user H to each pixel 48 is handled in common as the angle $\theta U4$ in center coordinate control of a blurring area corresponding to each of a plurality of pixels 48 included in the display device 101. The angle of a visual line from the user H to each pixel 48 is handled in common as the angle $\theta D4$ in center coordinate control of a blurring area corresponding to each of a plurality of pixels 48 included in the display device 102. In other words, in the configuration illustrated in FIG. 13, the amount of shift between the center of a blurring area (for example, the blurring area B1 or B2; refer to FIG. 12) generated when a pixel 48 is controlled to transmit light and the normal to the first panel passing through the center of a pixel 48 (for example, the pixel PP1 or PP2; refer to FIG. 12) not positioned on the above-described reference normal (for example, the emission line LC0 illustrated in FIG. 12) is constant for each display device (the display device 101 and the display device 102). The amount of shift between the center of a blurring area (for example, the blurring area B1 or B2) generated when a pixel 48 not positioned on the above-described reference normal (for example, the emission line LC0 illustrated in FIG. 12) is controlled to transmit light and the normal to the display panel 30 passing through the center of the pixel 48 (the normal CP) depends on fourth and fifth factors described below. The fourth factor is the angle (for example, the angle θU4 or the angle θD4) between a line segment (for example, the visual line VUa or the visual line VDb) connecting the viewpoint of the user H and the center of the display panel 30 and the normal (for example, the normal LL1 or the normal LL2) to the display panel 30 passing through the center of the display panel 30. The fifth factor is the relative refractive index difference (n) between air around the display device 1 and an optical member (for example, the second polarizer P2, the third polarizer P3, and/or the diffusion layer P5 illustrated in FIG. 2) provided between the first panel and the second panel (light control panel 80).

The following describes a specific exemplary configuration provided as the display devices 101 and 102 with reference to FIG. 14. FIG. 14 is a schematic diagram illustrating exemplary installation of a four-wheel automobile including the display devices 101 and 102. The display device 101 illustrated in FIG. 14 is provided as what is called a rearview mirror. The display device 101 displays an image (for example, a moving image) output from an image-capturing device configured to capture an image of a space posterior to the four-wheel automobile. The display device 102 illustrated in FIG. 14 is provided as a display in the dashboard. The display device 102 is coupled to devices such as a speed meter and a fuel meter of the four-wheel automobile, which output various kinds of information indicating the state of the four-wheel automobile, and performs display corresponding to display output images of each device.

In FIG. 14, a front glass FG, a sight glass SG, an A pillar AP between the front glass FG and the sight glass SG, and a handle HN are illustrated to schematically illustrate the positions of the display devices 101 and 102 in the four-wheel automobile. A side mirror display illustrated in FIG. 14 is a display device provided in place of a side mirror. The side mirror display may be the display device 1 described above with reference to FIGS. 1 to 9. In this case, the center coordinate control of a blurring area in the side mirror display is performed in the same manner as in the display devices 101 and 102 described above with reference to FIG. 13.

Visual lines such as the visual line VUa and the visual line VDb described above, in other words, the angles θU4 and θD4 may be determined in advance for the display devices 101 and 102 and the side mirror display illustrated in FIG. 14 by assuming the position of the viewpoint E of the user H as a driver sitting at a position where the driver can grip the handle HN. In addition, the relative refractive index difference (n) is determined at designing the display devices 101 and 102 and the side mirror display. Thus, these determined parameters are stored in the visual information holder 12 in advance to perform the center coordinate control of a blurring area suitable for the position of the viewpoint E of the user H as the driver. When a display device is provided facing another user H sitting on a seat other than the driver's seat, visual lines such as the visual lines VUa and VDb described above, in other words, the angles θU4 and θD4 are determined in advance by assuming the position of the viewpoint E of the other user H, and accordingly, the center coordinate control of a blurring area suitable for the position of the viewpoint E of the other user H can be performed.

In the display devices 101 and 102 and the like described above with reference to FIGS. 13 and 14, as well, the center coordinate control of a blurring area suitable for the position of the viewpoint E of the user H can be performed in the X direction as well as in the Y direction by determining the angle between the user H and each of the display devices 101 and 102 and the like in the X direction in advance.

As described above, according to the embodiment, the display device 1 includes a first panel (the display panel 30) including a plurality of pixels 48, a second panel (the light control panel 80) that includes one surface disposed opposing one surface of the first panel and includes a plurality of light control pixels 148, and a light source (the light source device 50) configured to emit light to the other surface of the second panel. In the display device 1, when any of the pixels 48 is controlled to transmit light in accordance with an input image signal, blurring processing by which a plurality of light control pixels 148 are controlled to transmit light is applied, a blurring area (for example, the blurring area wid; refer to FIGS. 6 and 11) including the plurality of light control pixels to which the blurring processing is applied is formed, light from the light source transmits through the blurring area and the pixel 48 and is emitted from the other surface of the first panel. When the pixel 48 controlled to transmit light is not positioned on a visual line (for example, the emission line LC0 illustrated in FIG. 11, or the visual line VUa or VDb illustrated in FIG. 13) from a predetermined viewpoint (viewpoint E) of a user (user H) along a normal to the first panel, the center of the blurring area generated in correspondence with the pixel 48 not positioned on the visual line is at a position shifted to a side opposite to the visual line side relative to the normal (for example, the normal CP illustrated in FIG. 12) to the first panel passing through the center of the pixel 48.

Accordingly, the positional relation between a pixel 48 that transmits light and the center of a blurring area that allows transmission of the light transmitting through the pixel 48 becomes a positional relation corresponding to a predetermined viewpoint of a user (user H). Thus, more favorable display quality corresponding to a user viewpoint position assumed in advance is obtained.

In the configuration illustrated in FIGS. 10 and 11, the amount of shift between the center of a blurring area (for example, the blurring area wid) generated when a pixel 48 not positioned on a predetermined visual line (for example, the visual line VC0 illustrated in FIG. 10) of a user (user H) along a normal to the first panel (display panel 30) is controlled to transmit light and a normal to the first panel passing through the center of the pixel 48 is larger as the distance between the pixel 48 and the visual line is longer. Accordingly, the positional relation between a pixel 48 that transmits light and the center of a blurring area that allows transmission of the light transmitting through the pixel 48 more reliably becomes a positional relation corresponding to a predetermined viewpoint of a user (user H) on a pixel 48 basis.

In the configuration illustrated in FIGS. 13 and 14, the amount of shift between the center of a blurring area (for example, the blurring area B1 or B2; refer to FIG. 12)

generated when a pixel 48 is controlled to transmit light and a normal to the first panel passing through the center of the pixel 48 not positioned on a predetermined visual line of a user (user H) along a normal to the first panel (display panel 30) (for example, the emission line LC0 in FIG. 12 corresponding to the visual line VC0 in FIG. 10) is constant. Accordingly, the positional relation between a pixel 48 that transmits light and the center of a blurring area that allows transmission of the light transmitting through the pixel 48 is uniform among the pixels 48, and thus position control of the blurring area can be further simplified. With such processing, sufficient display quality corresponding to a user viewpoint position assumed in advance is obtained when the pixels 48 have little difference in positional relation with a user viewpoint (viewpoint E).

In the configuration illustrated in FIGS. 10 and 11, the amount of shift between the center (center CL) of a blurring area (for example, the blurring area wid) generated when a pixel 48 not positioned on a predetermined visual line (for example, the emission line LC0 illustrated in FIG. 11) of a user (user H) along a normal to the first panel (display panel 30) is controlled to transmit light and a normal to the first panel passing through the center of the pixel 48 depends on the first to third factors. The first factor is the distance (the distance d illustrated in FIG. 12) between a predetermined viewpoint (viewpoint E) of a user (user H) and the first panel. The second factor is the relative refractive index difference between air around the display device 1 and an optical member (for example, the second polarizer P2, the third polarizer P3, or the diffusion layer P5 illustrated in FIG. 2) provided between the first panel and the second panel (light control panel 80). The third factor is the distance between a normal to the first panel passing through the viewpoint and the pixel 48. Accordingly, the positional relation between a pixel 48 that transmits light and the center of a blurring area that allows transmission of the light transmitting through the pixel 48 more reliably becomes the positional relation corresponding to a predetermined viewpoint of a user (user H) on a pixel 48 basis.

In the configuration illustrated in FIGS. 13 and 14, the amount of shift between the center of a blurring area (for example, the blurring area B1 or B2) generated when a pixel 48 not positioned on a predetermined visual line (for example, the emission line LC0 illustrated in FIG. 12) of a user (user H) along a normal to the first panel (display panel 30) is controlled to transmit light and the normal (the normal CP) to the first panel passing through the center of the pixel 48 depends on the fourth and fifth factors. The fourth factor is the angle (for example, the angle θU4 or the angle θD4) between a line segment (for example, the visual line VUa or the visual line VDb) connecting the viewpoint of the user and the center of the first panel and a normal (for example, the normal LL1 or the normal LL2) to the first panel passing through the center. The fifth factor is the relative refractive index difference between air around the display device 1 and an optical member (for example, the second polarizer P2, the third polarizer P3, or the diffusion layer P5 illustrated in FIG. 2) provided between the first panel and the second panel (light control panel 80). Accordingly, the positional relation between a pixel 48 that transmits light and the center of a blurring area that allows transmission of the light transmitting through the pixel 48 more reliably becomes the positional relation corresponding to a predetermined viewpoint of a user (user H) on a pixel 48 basis.

The display device 1 includes a processor (signal processor 10) configured to control operation of the light control pixel 148 based on relative position information related to the positional relation between the viewpoint of a user (user H) and the first panel (display panel 30) and information indicating the distance between the first panel and the second panel (light control panel 80) in a direction in which the first panel and the second panel are opposed to each other. Accordingly, the display device 1 can perform processing by which the positional relation between a pixel 48 that transmits light and the center of a blurring area that allows transmission of the light transmitting through the pixel 48 more reliably becomes the positional relation corresponding to a predetermined viewpoint of a user (user H) on a pixel 48 basis.

The processor (signal processor 10) includes a register (visual information holder 12) to which relative position information related to the positional relation between the viewpoint of a user (user H) and the first panel (display panel 30) can be written. Accordingly, information for determining the positional relation between a pixel 48 that transmits light and the center of a blurring area that allows transmission of the light transmitting through the pixel 48 can be written at any timing such as the timing of setting before product shipment or operation.

A display device to which the second embodiment is applicable is not limited to the display device 101 and the like described above with reference to FIG. 14. For example, a display device of the second embodiment may be provided as a display device installed in front of a seat on which a passenger sits in an aircraft.

It should be understood that the present disclosure provides any other effects achieved by aspects described above in the present embodiment, such as effects that are clear from the description of the present specification or effects that could be thought of by the skilled person in the art as appropriate.

What is claimed is:
1. A display device comprising:
a first panel including a plurality of pixels;
a second panel that includes one surface disposing one surface of the first panel and includes a plurality of light control pixels; and
a light source configured to emit light to the other surface of the second panel, wherein
when any of the pixels is controlled to transmit light in accordance with an input image signal, blurring processing by which more than one of the light control pixels is controlled to transmit light is applied, a blurring area including the more than one of the light control pixels to which the blurring processing is applied is formed, and light from the light source transmits through the blurring area and the pixel controlled to transmit light and is emitted from the other surface of the first panel,
when a straight line connecting a user viewpoint and the pixel controlled to transmit light in the first panel has an angle relative to a normal to the first panel, a center of the blurring area generated in correspondence with the pixel is at a position shifted to a side opposite to a reference normal side where a reference normal is positioned, relative to the normal to the first panel passing through a center of the pixel, and
the reference normal is a normal to the first panel passing through the viewpoint.

2. The display device according to claim 1, wherein the amount of shift between the center of the blurring area generated when a pixel not positioned on the reference normal among the pixels is controlled to transmit light and a normal to the first panel passing through the center of the pixel is larger as the distance between the pixel and the reference normal is longer.

3. The display device according to claim 1, wherein the amount of shift between the center of the blurring area generated when a pixel among the pixels is controlled to transmit light and a normal to the first panel passing through the center of the pixel not positioned on the reference normal is constant.

4. The display device according to claim 2, wherein the amount of shift between the center of the blurring area generated when a pixel not positioned on the reference normal among the pixels is controlled to transmit light and the normal to the first panel passing through the center of the pixel corresponds to the distance between a predetermined user viewpoint and the first panel, a relative refractive index difference between air around the display device and an optical member provided between the first panel and the second panel, and the distance between a normal to the first panel passing through the user viewpoint and the pixel.

5. The display device according to claim 3, wherein the amount of shift between the center of the blurring area generated when a pixel not positioned on the reference normal is controlled to transmit light and a normal to the first panel passing through the center of the pixel corresponds to an angle between a line segment connecting a predetermined user viewpoint and a center of the first panel and a normal to the first panel passing through the center of the first panel, and a relative refractive index difference between air around the display device and an optical member provided between the first panel and the second panel.

6. The display device according to claim 4, further comprising a processor configured to control operation of the light control pixels based on relative position information related to a positional relation between the user viewpoint and the first panel and information indicating a distance between the first panel and the second panel in a direction in which the first panel and the second panel are opposed to each other.

7. The display device according to claim 5, further comprising a processor configured to control operation of the light control pixels based on relative position information related to a positional relation between the user viewpoint and the first panel and information indicating a distance between the first panel and the second panel in a direction in which the first panel and the second panel are opposed to each other.

8. The display device according to claim 6, wherein the processor includes a register allowing the relative position information to be written therein.

9. The display device according to claim 7, wherein the processor includes a register allowing the relative position information to be written therein.

* * * * *